US006551695B2

(12) United States Patent
Kaneko et al.

(10) Patent No.: US 6,551,695 B2
(45) Date of Patent: Apr. 22, 2003

(54) INK-JET RECORDING MATERIAL

(75) Inventors: Satoshi Kaneko, Tokyo (JP); Tomoko Ishimaru, Tokyo (JP); Yukihiro Suzuki, Tokyo (JP); Hiroshi Sakaguchi, Tokyo (JP)

(73) Assignee: Mitsubishi Paper Mills, Limited, Tokyo (JP)

(*) Notice: Subject to any disclaimer, the term of this patent is extended or adjusted under 35 U.S.C. 154(b) by 99 days.

(21) Appl. No.: 09/758,170

(22) Filed: Jan. 12, 2001

(65) Prior Publication Data

US 2001/0014381 A1 Aug. 16, 2001

(30) Foreign Application Priority Data

| | | |
|---|---|---|
| Jan. 14, 2000 | (JP) | 2000-010074 |
| Jan. 14, 2000 | (JP) | 2000-010078 |
| Jan. 14, 2000 | (JP) | 2000-010079 |
| Mar. 28, 2000 | (JP) | 2000-089121 |
| May 30, 2000 | (JP) | 2000-160693 |
| May 12, 2000 | (JP) | 2000-140202 |
| Jun. 6, 2000 | (JP) | 2000-168670 |
| Jul. 13, 2000 | (JP) | 2000-212563 |
| Aug. 23, 2000 | (JP) | 2000-252649 |
| Sep. 22, 2000 | (JP) | 2000-288169 |

(51) Int. Cl.[7] .......................... B32B 27/14; B32B 3/00

(52) U.S. Cl. ........................ 428/195; 428/331; 428/500

(58) Field of Search ................................ 428/195, 212, 428/331, 341, 411.1, 500, 480

(56) References Cited

U.S. PATENT DOCUMENTS

| | | | | | |
|---|---|---|---|---|---|
| 5,985,424 | A | * | 11/1999 | DeMatte et al. | 428/212 |
| 6,140,406 | A | * | 10/2000 | Schliesman et al. | 524/493 |
| 6,177,181 | B1 | * | 1/2001 | Hamada et al. | 428/304.4 |
| 6,180,238 | B1 | * | 1/2001 | Malhotra | 428/411.1 |

OTHER PUBLICATIONS

Detasheet for AEROSIL MOX 170, Aerosil/Degussa website printed on Jun. 6, 2002.*

* cited by examiner

*Primary Examiner*—Cynthia H. Kelly
*Assistant Examiner*—B. Shewareged
(74) *Attorney, Agent, or Firm*—Paul E. White, Jr.; Manelli Denison & Selter PLLC

(57) ABSTRACT

There is disclosed an ink-jet recording material which comprises a support, and an ink-receptive layer containing fumed silica having an average primary particle size of 3 nm to 30 nm provided on the support, wherein said ink-receptive layer contains a cationic compound and at least one compound selected from the group consisting of a sulfur-containing compound having no mercapto group, an amine compound, an amino compound and a saccharide, and a pH of the surface of the ink-jet recording material is 3 to 6.

17 Claims, No Drawings

INK-JET RECORDING MATERIAL

BACKGROUND OF THE INVENTION

1. Field of the Invention

This invention relates to an ink-jet recording material, particularly to an ink-jet recording material which has photo-like high gloss, is excellent in ink-absorption capacity, and is improved in preservability after printing.

2. Prior Art

As a recording material to be used for an ink-jet recording system, a recording material which comprises a porous ink-receptive layer comprising a pigment such as amorphous silica, and a hydrophilic binder such as polyvinyl alcohol being provided on a support such as a usual paper or the so-called ink-jet recording sheet has generally been known.

There have been proposed recording sheets obtained by coating a silicon-containing pigment such as silica with a hydrophilic binder onto a paper support as disclosed in, for example, Japanese Provisional Patent Publications No. 51583/1980, No. 157/1981, No. 107879/1982, No. 107880/1982, No. 230787/1984, No. 204390/1985, No. 160277/1987, No. 184879/1987, No. 183382/1987, No. 11877/1989, and the like.

Also, in Japanese Patent Publication No. 56552/1991, Japanese Provisional Patent Publications No. 188287/1990, No. 81064/1998, No. 119423/1998, No. 175365/1998, No. 203006/1998, No. 217601/1998, No. 20300/1999, No. 20306/1999 and No. 34481/1999, U.S. Pat. No. 5,612,281, and EP 0 813 978 A, and the like, there have been disclosed ink-jet recording materials using synthetic silica fine particles prepared by a gas phase process (hereinafter referred to as "fumed silica"). The fumed silica is ultrafine particles having an average particle size of a primary particle of several nm to several tens nm, and has characteristics of giving high gloss and high ink-absorption properties. In recent years, a photo-like recording sheet has earnestly been desired and glossiness becomes more important. As such a recording material, there has been proposed a recording material in which an ink-receptive layer mainly comprising fumed silica is provided by coating on a water-proof support such as a polyolef in resin-coated paper (a polyolef in resin such as polyethylene, etc. are laminated on the both surfaces of paper) or a polyester film, etc.

However, in the porous recording material using inorganic fine particles such as the fumed silica, there is a problem that the printed image is likely discolored during storage. That is, discoloration due to light or a minute amount of a gas in air is likely caused. In particular, it is a more significant problem of discoloration due to a minute amount of a gas in air.

SUMMARY OF THE INVENTION

An object of the present invention is to provide an ink-jet recording material which has photo-like high gloss and high ink-absorption capacity, and is improved in preservability.

The above objects of the present invention can be accomplished by an ink-jet recording material which comprises a support, and an ink-receptive layer containing fumed silica having an average primary particle size of 3 to 30 nm provided on the support, wherein said ink-receptive layer contains a cationic compound and at least one selected from the group consisting of a sulfur-containing compound having no mercapto group, an amine compound, an amino compound and a saccharide, and a pH of the surface of said ink-jet recording material is 3 to 6.

DESCRIPTION OF THE PREFERRED EMBODIMENTS

In the following, the embodiments of the present invention are explained in detail.

The ink-jet recording material of the present invention is to absorb ink in voids formed by the fumed silica having an average primary particle size of 3 to 30 nm in the film, and to realize high ink-absorption capacity, it is necessary to heighten void volume. Thus, it is necessary to coat a relatively large amount of the fumed silica on the support, and when a hydrophilic binder is used, its amount is preferably reduced to heighten the void ratio.

The fumed silica to be used in the present invention is preferably contained in the ink-receptive layer in an amount of about 8 $g/m^2$ or more, more preferably in the range of about 10 to about 30 $g/m^2$. If the amount is less than the above range, ink-absorption capacity is sometimes poor. An amount of the hydrophilic binder is preferably about 40% by weight or less, more preferably about 10 to about 30% by weight based on the amount of the fumed silica. By making the ratio of the hydrophilic binder as mentioned above, ink-absorption capacity is improved but preservability after printing, particularly gas resistance is likely lowered. These properties are simultaneously satisfied by the constitution of the present invention as defined above.

In the present invention, the fumed silica is preferably contained in the ink-receptive layer as a main component, i.e., it is preferably contained in an amount of about 50% by weight or more, more preferably about 60% by weight or more, further preferably about 65% by weight or more based on the total weight of the whole solid components in the ink-receptive layer. Fumed silica to be used in the present invention is also called to as the drying method silica, and the fumed silica can be generally prepared by a flame hydrolysis method. More specifically, it has been known a method in which silicon tetrachloride is burned with hydrogen and oxygen. In this method, silanes such as methyl trichlorosilane, trichlorosilane, etc., may be used alone in place of silicon tetrachloride or in combination with silicone tetrachloride. The fumed silica is commercially available from Nippon Aerosil K.K. (Japan) under the trade name of Aerosil, and K.K. Tokuyama (Japan) under the trade name of QS type, etc.

An average primary particle size of the fumed silica to be used in the present invention is 3 nm to 30 nm, particularly preferably 3 nm to 15 nm. More preferably, those having an average primary particle size of 3 to 15 nm and a specific surface area measured by the BET (Brunauer-Emmett-Teller) method of 200 $m^2/g$ or more. The BET method herein mentioned means one of methods for measuring a surface area of powder material by a gas phase adsorption method and is a method of obtaining a total surface area possessed by 1 g of a sample, i.e., a specific surface area, from an adsorption isotherm. As an adsorption gas, a nitrogen gas has frequently been used, and a method of measuring an adsorption amount obtained by the change in pressure or a volume of a gas to be adsorbed has most frequently been used. Most frequently used equation for representing isotherm of polymolecular adsorption is a Brunauer-Emmett-Teller equation which is also called to as a BET equation and has widely been used for determining a surface area of a substance to be examined. A specific surface area can be obtained by measuring an adsorption amount based on the BET equation and multiplying the amount with a surface area occupied by the surface of one adsorbed molecule.

In the present invention, as the hydrophilic binder to be preferably used with the fumed silica, conventionally known various binders can be used, and a hydrophilic binder which has high transparency and gives high permeability is preferably used. For using the hydrophilic binder, it is important that the hydrophilic binder does not clog the voids by swelling at the initial stage of permeation of ink. From this point of view, a hydrophilic binder having a relatively low swellability at around the room temperature is preferably used. A particularly preferred hydrophilic binder is a completely or partially saponified polyvinyl alcohol or a cationic-modified polyvinyl alcohol.

Among the polyvinyl alcohols, particularly preferred are those having a saponification degree of 80% or more, i.e., apartially saponified or completely saponified polyvinyl alcohol. Those having an average polymerization degree of 200 to 5000 are preferred.

Also, as the cationic-modified polyvinyl alcohol, there may be mentioned, for example, a polyvinyl alcohol having a primary to tertiary amino groups or a quaternary ammonium group at the main chain or side chain of the polyvinyl alcohol as disclosed in Japanese Provisional Patent Publication No. 10483/1986.

In the present invention, it is preferred to use, in combination with the hydrophilic binder, a cross-linking agent (film hardening agent) of said binder. Specific examples of the cross-linking agent may include an aldehyde type compound such formaldehyde and glutaraldehyde; a ketone compound such as diacetyl and chloropentanedione; bis(2-chloroethylurea)-2-hydroxy-4,6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. Nos. 3,017,280 and 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, potassium alum, zirconium sulfate, boric acid and a borate, and they may be used singly or in combination of two or more. Among these, boric acid or a borate is particularly preferred.

In the present invention, by providing, on a support, an ink-receptive layer containing fumed silica having an average primary particle size of 3 nm to 30 nm, a cationic compound and at least one selected from the group consisting of a sulfur-containing compound having no mercapto group, an amine compound, an amino compound and a saccharide, and a pH of the surface of said ink-jet receptive layer is 3 to 6, preservability of the printed articles after printing can be markedly improved.

As the sulfur-containing compound having no mercapto group, particularly preferred are sulfinic acid, thiosulfonic acid, thiosulfinic acid, a thioether compound, a polysulfide compound, a thiourea type compound and a mesoionic compound. In Japanese Provisional Patent Publication No. 314882/1995, there is disclosed that discoloration due to preservation can be improved by using a dithiocarbamate, a thiocyanic acid ester a thiocyanate, etc. In the present invention, however, it has found that water resistance, light resistance and gas resistance can be simultaneously satisfied with extremely high levels by the ink-jet recording material having a void layer with a specific pH range, which contains fumed silica, the cationic compound and the sulfur-containing compound having no mercapto group.

As the sulfinic acid compound, the compound represented by the following formula (I) is preferred.

$$R—SO_2M \qquad (I)$$

wherein R represents a substituted or unsubstituted alkyl group (preferably having 6 to 30 carbon atoms), a substituted or unsubstituted aryl group (such as a phenyl group, a naphthyl group, preferably having 6 to 30 carbon atoms), and M represents a hydrogen atom, an alkali metal atom or ammonium.

As the subszituent for the group represented by the above-mentioned R, there may be mentioned, for example, a straight, branched or cyclic alkyl group (preferably having 1 to 20 carbon atoms), an aralkyl group (preferably a monocylic or bicyclic and having 1 to 3 carbon atoms as the alkyl portion), an alkoxy group (preferably having 1 to 20 carbon atoms), a mono- or di-substituted amino group (preferably having, as a substituent (s), an alkyl group, an acyl group, an alkylsulfonyl group or an arylsulfonyl group each having 1 to 20 carbon atoms, and when it is a di-substituted amino group, the total carbon number of the substituents is 20 or less), a mono- to tri-substituted or unsubstituted ureido group (preferably having 1 to 20 carbon atoms), a substituted or unsubstituted aryl group (preferably a monocylic or bicyclic aryl group having 6 to 29 carbon atoms), a substituted or unsubstituted arylthio group (preferably having 6 to 29 carbon atoms), a substituted or unsubstituted alkylthio group (preferably having 1 to 29 carbon atoms), a substituted or unsubstituted alkylsulfoxy group (preferably having 1 to 29 carbon atoms), a substituted or unsubstituted arylsulfoxy group (preferably having a monocylic or bicyclic aryl group with 6 to 29 carbon atoms), a substituted or unsubstituted alkylsulfonyl group (preferably having 1 to 29 carbon atoms), a substituted or unsubstituted arylsulfonyl group (preferably having a monocylic or bicyclic aryl group with 6 to 29 carbon atoms), an aryloxy group (preferably having a monocylic or bicyclic aryl group with 6 to 29 carbon atoms), a carbamoyl group (preferably 1 to 29 carbon atoms), a sulfamoyl group (preferably having 1 to 29 carbon atoms), a hydroxy group, a halogen atom (fluorine, chlorine, bromine, iodine), a sulfonic acid group or a carboxylic acid group, etc.

These substituents may further have at least one substituent selected from the group consisting of an alkyl group, an aryl group, an alkoxy group, an aryloxy group, an alkylthio group, an arylthio group, an alkylsulfonyl group, an arylsulfonyl group, a carbonamide group, a sulfonamide group, a carbamoyl group, a sulfamoyl group, an alkylsul foxy group, an arylsulfoxy group, an ester group, a hydroxy group, a carboxy group, a sulfo group and a halogen atom. These groups may form a ring by combining with each other. Also, these groups may be a part of a homopolymer or copolymer chain.

As the thiosulfonic acid compound, the compounds represented by the following formulae (II-a) to (II-c) are preferred.

$$Z—SO_2—S—M \qquad (II\text{-}a)$$

(II-b)

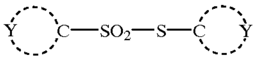

(II-c)

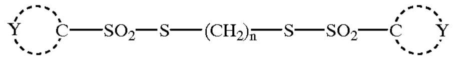

wherein Z represents a substituted or unsubstituted alkyl group (preferably having 1 to 18 carbon atoms), a substituted or unsubstituted aryl group (preferably having 6 to 18 carbon atoms) or a substituted or unsubstituted heterocyclic group, Y represents atoms necessary for forming a substituted or unsubstituted aromatic ring (preferably having 6 to 18 carbon atoms) or a substituted or unsubstituted hetero ring, M represents a metal atom or an organic cation, and n is an integer of 2 to 10.

As the substituent for the groups represented by the above-mentioned Z and Y, there may be preferably mentioned, for example, a lower alkyl group such as a methyl group, an ethyl group, etc., an aryl group such as aphenyl group, etc., an alkoxy group having 1 to 8 carbon atoms, a halogen atom such as a chlorine atom, a nitro group, an amino group, a carboxy group, and the like. As the metal atom represented by M, there may be preferably mentioned an alkali metal atom such as sodium, potassium, etc., and an organic cation such as ammonium, guanidine, etc.

As the thiosulfinic acid compound, the compounds represented by the following formulae (III-a) to (III-c) are preferred.

(III-a)

Z—SO—S—M (III-b)

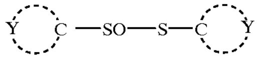

(III-c)

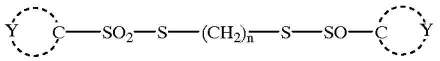

wherein Z, Y, M and n have the same meanings as defined in the above-mentioned formulae (II-a) to (II-c).

In the following, specific examples of the above-mentioned sulfinic acid compound, thiosulfonic acid compound and thiosulfinic acid compound are shown but the present invention is not limited by these.

(I-1)

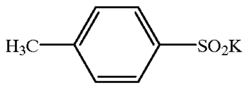

(I-2)

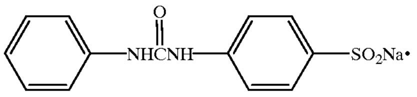

(I-3)

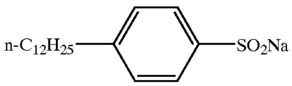

(I-4)

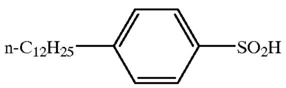

(I-5)

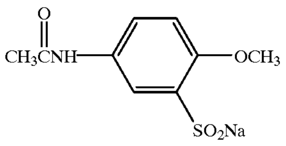

-continued (I-6)

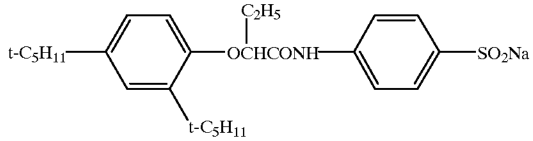

(I-7)

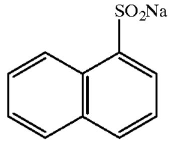

(I-8)

n-$C_8H_{17}SO_2Na$ (I-9)

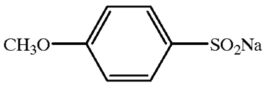

(I-10)

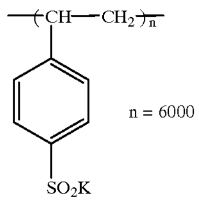

(II-1)

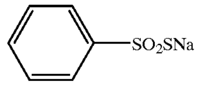

(II-2)

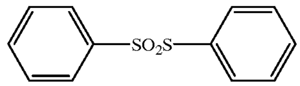

(II-3)

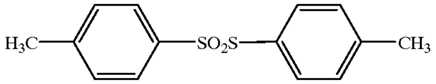

(II-4)

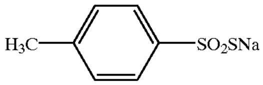

(II-5)

$CH_3SO_2SNa$ (II-6)

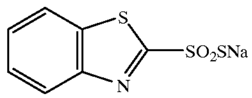

(II-7)

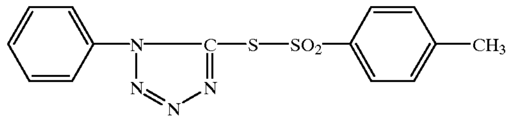

(II-8)

$C_2H_5SO_2SNa$

-continued (II-9)

$nC_{12}H_{25}SO_2SNa$ (II-10)

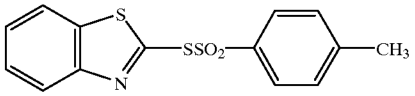

resistance and gas resistance can be simultaneously satisfied with extremely high levels by the ink-jet recording material having a void layer with a specific surface pH range, which contains fumed silica fine particles as well as the cationic compound and the thioether compound.

The thioether compound preferably used in the ink-receptive layer according to the present invention is a compound in which aromatic groups are bonded to a sulfur atom (compounds represented by the following formulae (IV-a) to (IV-c)) and a compound in which alkyl groups (preferably having 4 or more carbon atoms) are bonded to a sulfur atom (compounds represented by the following formulae (IV-d) and (IV-e)).

(IV-a)

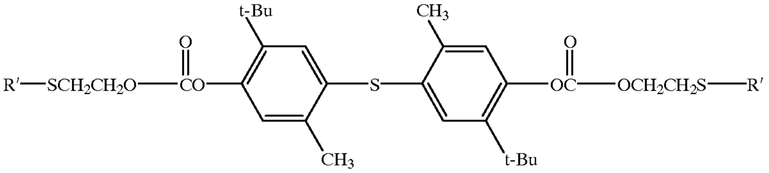

-continued (II-11)

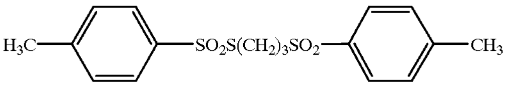

(II-12)

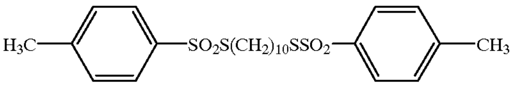

(III-1)

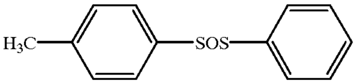

(III-2)

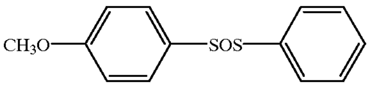

(III-3)

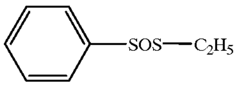

(III-4)

$C_2H_5SOSK$ (III-5)

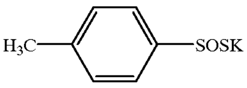

In Japanese Provisional Patent Publication No. 115677/1989, it is disclosed that the problem of yellowing caused by being adsorbed by silica particles in an ink-receptive layer an additive in a contacting material such as a file, etc., is solved by using a thioether compound. In the present invention, however, it has found that water resistance, light wherein R' represents an alkyl group having 12 to 14 carbon atoms.

(IV-b)

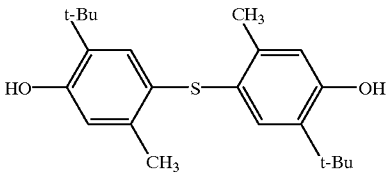

(IV-c)

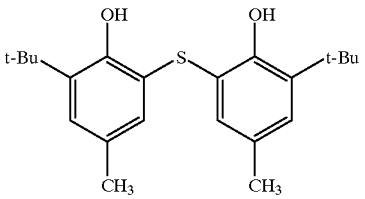

(IV-d)

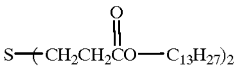

(IV-e)

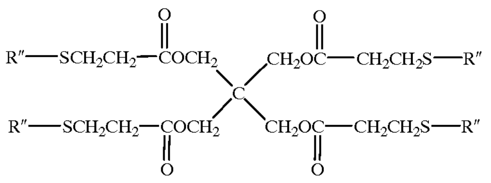

wherein R" represents an alkyl group having 12 carbon atoms.

The polysulfide compound to be used in the present invention may include the compound represented by the following formula (V):

$$R^1-(S)_m-R^2 \quad (V)$$

wherein $R^1$ and $R^2$ each represent an organic group, and m is an integer of 2 or more, preferably 2 to 6.

In the formula (V), $R^1$ and $R^2$ each represent an organic group containing a carbon atom bonded to the sulfur atom of the polysulfide. This organic group may form a substituted or unsubstituted aliphatic group, a substituted or unsubstituted aromatic group or a substituted or unsubstituted heterocyclic group with the carbon atom bonded to the sulfur atom of the polysulfide, or may be an organic group in which a substituted or unsubstituted aliphatic group, aromatic group, heterocyclic group, amino group, imino group, oxygen atom, sulfur atom, etc. is bonded to the carbon atom bonded to the sulfur atom of the polysulfide. Also, $R^1$ and $R^2$ may be the same or different from each other, and may form a ring by bonding to each other. Also, the substituent(s) of the $R^1$ and $R^2$ may be at least one substituents selected from the group consisting of an alkyl group, an aryl group, a heterocyclic group, an amino group, an amide group, an imino group, an ammonium group, a hydroxy group, a sulfo group, a carboxyl group, an aminocarbonyl group, an aminosulfonyl group and a halogen atom. m is an integer of 2 or more, preferably 2 to 6.

Particularly preferred examples of the compound represented by the formula (V) are compounds at least one of $R^1$ and $R^2$ has a hydrophilic substituent such as an amino group, an amide group, an imino group, an ammonium group, a hydroxy group, a sulfo group, a carboxyl group, an aminocarbonyl group and an aminosulfonyl group. In the following, specific examples of the compound represented by the formula (V) are shown but the present invention is not limited by these.

(V-1)

$CH_3—S—S—CH_3$ (V-2)

$H_2C{=}CHCH_2—S—S—CH_2CH{=}CH_2$ (V-3)

$HOCH_2CH_2—S—S—CH_2CH_2OH$ (V-4)

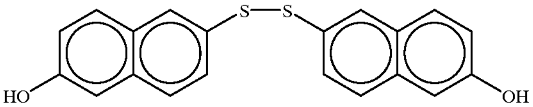

(V-5)

$HOOCCH_2CH_2—S—S—CH_2CH_2COOH$ (V-6)

$HOOCCH_2CH_2CH_2—S—S—CH_2CH_2CH_2COOH$ (V-7)

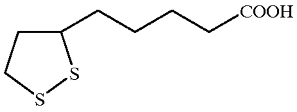

(V-8)

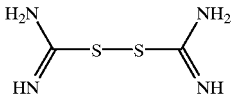 •2HCl

-continued (V-9)

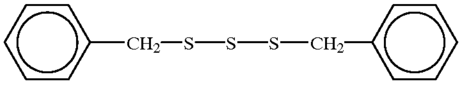

(V-10)

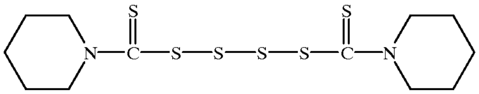

(V-11)

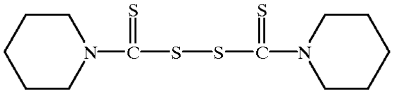

An amount of the compound of the present invention as mentioned above is preferably 0.1 to 50 mmol/$m^2$, more preferably 0.2 to 20 mmol/$m^2$ in the ink-receptive layer.

The present invention is to remarkably improve water resistance and preservability after printing by using fumed silica having a specific average primary particle size in combination with a cationic compound and a thiourea type compound as materials for the ink-receptive layer having a surface pH of 3 to 6, preferably a pH of 3 to 5. Here, the thiourea compound is a compound having at least one structure represented by the following formula (VI-a) in the molecule, and may include a thiourea derivative, a thiosemicarbazide derivative and a thiocarbohydrazide derivative.

(VI-a)

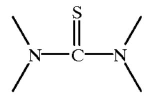

The thiourea type compound to be used in the present invention is disclosed in Japanese Provisional Patent Publication No. 163886/1986 that water resistance and light resistance of an ink-jet recording material can be improved by the compound. In the present invention, however, it has found that water resistance, light resistance and gas resistance can be simultaneously satisfied with extremely high levels by the ink-jet recording material having a void layer with a specific surface pH range, which contains fumed silica fine particles as well as the cationic compound and the thiourea compound.

The thiourea derivative, the thiosemicarbazide derivative and the thiocarbohydrazide derivative to be used in the present invention are preferably those represented by the following formulae (VI-b), (VI-c) and (VI-d), respectively.

(VI-b)

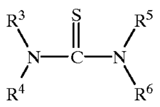

(VI-c)

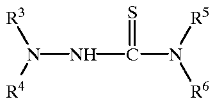

-continued (VI-d)

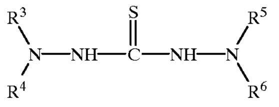

wherein $R^3$, $R^4$, $R^5$ and $R^6$ each represent a hydrogen atom, a substituted or unsubstituted alkyl group, aryl group, heterocyclic group, acyl group or guanyl group, and $R^3$ and $R^4$, $R^3$ and $R^5$ or $R^5$ and $R^6$ may form a ring by combining with each other.

As the thiourea type compound to be used in the present invention, the following compounds can be exemplified.

(VI-1)

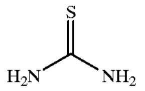

(VI-2)

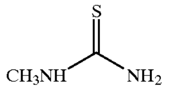

(VI-3)

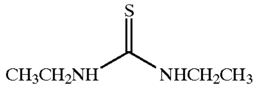

(VI-4)

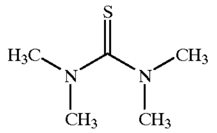

(VI-5)

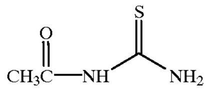

(VI-6)

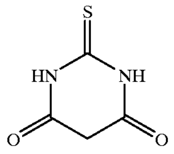

(VI-7)

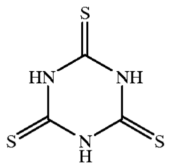

(VI-8)

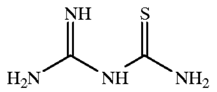

-continued (VI-9)

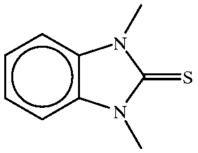

(VI-10)

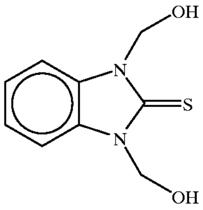

(VI-11)

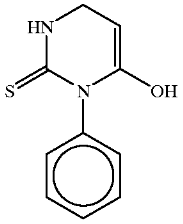

(VI-12)

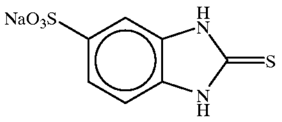

(VI-13)

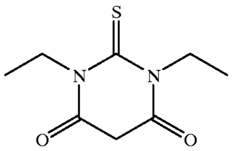

(VI-14)

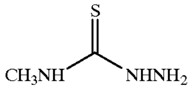

(VI-15)

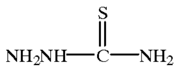

(VI-16)

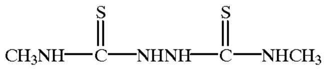

(VI-17)

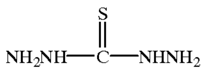

(VI-18)

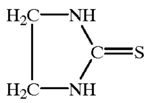

An amount of the above-mentioned thiourea type compound in the ink-receptive layer is preferably about 0. 1 to about 50 mmol/$m^2$, more preferably about 0.2 to about 20 mmol/$m^2$.

The mesoionic compound is known compounds in the filed of the silver halide photographic material and disclosed in, for example, Japanese Provisional Patent Publications No. 324448/1992, No. 328559/1992 and No. 83060/1994. As a sulfur-containing mesoionic compound to be used in the present invention, there may be mentioned a compound represented by the following formula (VII).

(VII)

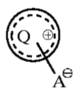

wherein Q represents a group of atoms necessary for forming a heterocyclic ring selected from the group consisting of a carbon atom, a nitrogen atom, an oxygen atom, a sulfur atom and a selenium atom, $A^-$ represents —$O^-$, —$S^-$ or —$N^-$—$R^7$ where $R^7$ represents an alkyl group preferably having 1 to 6 carbon atoms, a cycloalkyl group preferably having 3 to 6 carbon atoms, an alkenyl group preferably having 2 to 6 carbon atoms, an alkynyl group preferably having 2 to 6 carbon atoms, an aralkyl group preferably having 7 to 12 carbon atoms, an aryl group preferably having 6 to 12 carbon atoms or a heterocyclic group preferably having 6 or less carbon atoms, provided that at least one of Q and A includes a sulfur atom.

As the heterocyclic ring represented by Q, there may be mentioned a ring containing at least one of a 5-membered or 6-membered heterocyclic ring in the structure. Specific examples of the heterocyclic ring represented by Q may include, for example, an imidazolium ring, pyrazolium ring, oxazolium ring, isoxazolium ring, thiazolium ring, isothiazolium ring, 1,3-dithiol ring, 1,3,4-oxadiazolium ring, 1,2,3-oxadiazolium ring, 1,3,2-oxadiazolium ring, 1,2,3-triazolium ring, 1,3,4-triazolium ring, 1,3,4-thiadiazolium ring, 1,2,3-thiadiazolium ring, 1,2,4-thiadiazolium ring, 1,2,3,4-oxatriazolium ring, 1,2,3,4-tetrazolium ring, 1,2,3,4-thiatriazolium ring, etc.

Among the mesoionic compound to be used in the present invention, preferred are those represented by the following formulae (VII-a) and (VII-b).

(VII-a)

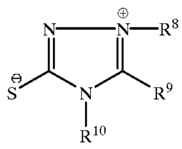

wherein $R^8$ and $R^{10}$ may be the same or different from each other, and each represent an alkyl group, a cycloalkyl group, an alkenyl group, an alkynyl group, an aralkyl group, an aryl group or a heterocyclic group, $R^9$ represents a hydrogen atom, an alkyl group, a cycloalkyl group, an alkenyl group, an alkynyl group, an aralkyl group, an aryl group or a heterocyclic group, and $R^8$ and $R^9$or $R^9$ and $R^{10}$ may form a ring by combining with each other.

(VII-b)

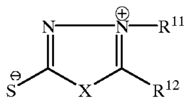

wherein X represents S or O, $R^{11}$ and $R^{12}$ may be the same or different from each other, and each represent an alkyl group, a cycloalkyl group, an alkenyl group, an alkynyl group, an aralkyl group, an aryl group, a heterocyclic group or a dialkylamino group.

Specific examples of the compound represented by the above formula (VII-a) are shown below but the present invention is not limited by these.

(VII-a-1)

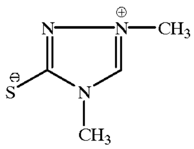

(VII-a-2)

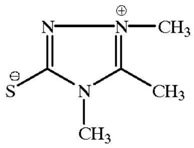

(VII-a-3)

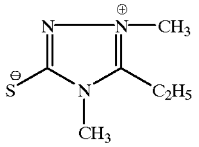

(VII-a-4)

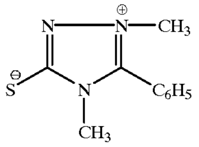

(VII-a-5)

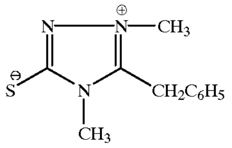

(VII-a-6)

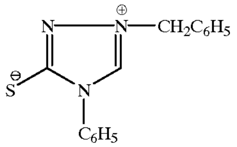

(VII-a-7)

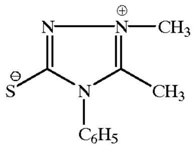

-continued (VII-a-8)

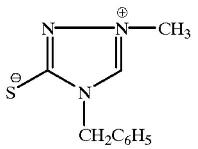

(VII-a-9)

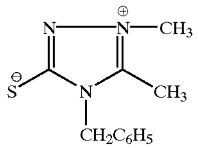

(VII-a-10)

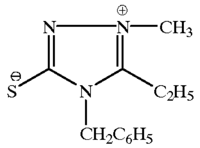

(VII-a-11)

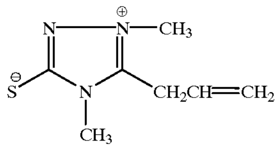

Specific examples of the compound represented by the above formula (VII-b) are shown below but the present invention is not limited by these.

(VII-b-1)

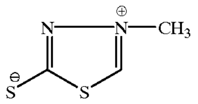

(VII-b-2)

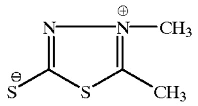

(VII-b-3)

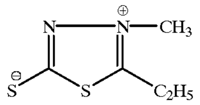

(VII-b-4)

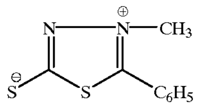

(VII-b-5)

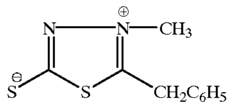

(VII-b-6)

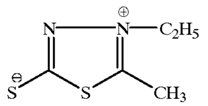

-continued (VII-b-7)

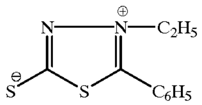

(VII-b-8)

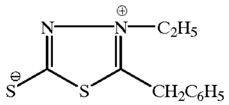

(VII-b-9)

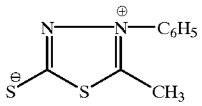

(VII-b-10)

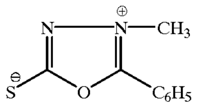

(VII-b-11)

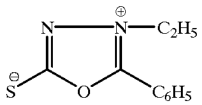

(VII-b-12)

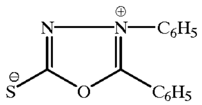

(VII-b-13)

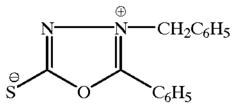

(VII-b-14)

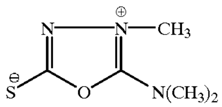

An amount of the above-mentioned mesoionic compound in the ink-receptive layer is preferably about 0–1 to about 50 mmol/$m^2$, more preferably about 0.2 to about 20mmol/$m^2$.

In the present invention, the amine or the amino compound to be used in the ink-receptive layer is represented by the following formulae (VIII) and (IX). In the present invention, however, it has found that water resistance, light resistance and gas resistance can be simultaneously satisfied with extremely high levels by the ink-jet recording material having a void layer with a specific surface pH range, which contains fumed silica fine particles as well as the cationic compound and the amine or the amino compound.

(VIII)

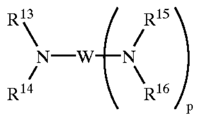

wherein $R^{13}$, $R^{14}$, $R^{15}$ and $R^{16}$ may be the same or different from each other and each represent a hydrogen atom, a substituted or unsubstituted aliphatic group (preferably an alkyl group having 1 to 20 carbon atoms, etc.), or a substituted or unsubstituted aromatic group (preferably an aryl group having 6 to 30 carbon atoms such as a phenyl group, a naphthyl group, etc.), and these may form a ring by combining with each other, p represents 0 or 1, and W represents a monovalent or divalent organic group.

As the substituent for the above-mentioned aliphatic group or aromatic group, there may be mentioned, for example, a straight, branched or cyclic alkyl group, an aralkyl group, alkoxy group, alkylsulfonyl group, arylsulfonyl group, ureido group, aryl group, arylthio group, alkylthio group, alkylsulfoxy group, arylsulfoxy group, alkylsulfonyl group, arylsulfonyl group, aryloxy group, carbamoyl group, sulfamoyl group, amino group, hydroxy group, hydroxyalkyl group, a halogen atom, a sulfonic acid group or carboxylic acid group.

In the formula (VIII), when p is 0 (such a compound is referred to as the compound (VIII-a) in the following), W represents a monovalent organic group such as a substituted or unsubstituted aromatic group (an aryl group having 6 to 30 carbon atoms such as a phenyl group, a naphthyl group, etc.), a substituted or unsubstituted higher aliphatic group (an alkyl group having 6 to 30 carbon atoms) or an aralkyl group such as a benzyl group, a phenethyl group, etc.

In the formula (VIII), when p is 1 (such a compound is referred to as the compound (VIII-b) in the following), W represents a divalent organic group such as a substituted or unsubstituted alkylene group, arylene group, etc. In these divalent group, at least one hetero atom such as an oxygen atom (—O—), nitrogen atom (—NH—), sulfur atom (—S—), etc., may be contained, and the nitrogen atom may have a substituent such as an alkyl group, etc.

As the substituent for the group represented by the above-mentioned W, there may be mentioned a straight, branched or cyclic alkyl group, an aralkyl group, alkoxy group, alkyl-sulfonyl group, arylsulfonyl group, ureido group, aryl group, arylthio group, alkylthio group, alkylsulfoxy group, aryl-sulfoxy group, alkylsulfonyl group, arylsulfonyl group, aryloxy group, carbamoyl group, sulfamoyl group, amino group, hydroxy group, hydroxyalkyl group, a halogen atom, a sulfonic acid group or carboxylic acid group, etc.

In the following, specific examples of the compound of the formula (VIII) where p is 0 are shown, but the present invention is not limited by these.

(VIII-a-1) Dodecylamine
(VIII-a-2) Stearylamine
(VIII-a-3) o-Toluidine
(VIII-a-4) 2-Aminobenzyl alcohol
(VIII-a-5) 2-Carboxyaniline
(VIII-a-6) 2-A-inophenol
(VIII-a-7) N,N-dimethylaminophenol
(VIII-a-8) 2,2'-(p-Tolylimino)diethanol
(VIII-a-9) 2,3-Diaminophenol
(VIII-a-10) 3-Ethylamino-4-methylphenol
(VIII-a-11) 3-Amino-4-methoxybiphenyl
(VIII-a-12) Diphenylamine hydrochloride
(VIII-a-13) 1-Aminonaphthalene
(VIII-a-14) N-Methyl-1-naphthylamine
(VIII-a-15) p-Dimethylaminobenzoic acid
(VIII-a-16) 2-N-Ethylanilinoethanol In the following, specific examples of the compound of the formula (VIII) where p is 1 are shown, but the present invention is not limited by these.

(VIII-b-l) 1,3-Diaminopropane
(VIII-b-2) 1,6-Diaminohexane
(VIII-b-3) 1,10-Diaminodecane
(VIII-b-4) N,N-Dibutyl-1,2-diaminoethane
(VIII-b-5) N,N-Diethyl-1,3-diaminopropane
(VIII-b-6) N,N,N',N'-Tetramethyl-1,3-propanediamine
(VIII-b-7) N,N,N',N'-Tetramethyl-1,6-hexanediamine
(VIII-b-8) Triethylenetetramine
(VIII-b-9) Tris(dimethylamino)methane
(VIII-b-10) 3,3'-Diamino-N-methyldipropylamine
(VIII-b-11) 4,4'-Diaminodiphenylamine In the present invention, by using the amino compound having two or more repeated alkylene oxide group, particularly that represented by the following formula (IX) in the ink-receptive layer, preservability of the printed material after printing can be markedly improved.

$$V—B—U \qquad (IX)$$

wherein V and U each represent a hydrogen atom, an aliphatic group, an aromatic group or a group containing a basic nitrogen atom, provided that at least one of V and U is a group containing a basic nitrogen atom, and B represents a divalent linking group having two or more alkylene oxide units.

Preferred amino compound of the formula (IX) may include the following compounds represented by the formulae (IX-a), (IX-b) and (IX-c).

(IX-a)

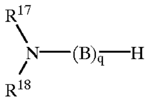

wherein $R^{17}$ and $R^{18}$ each represent a hydrogen atom, an alkyl group having 1 to 30 carbon atoms, an alkenyl group having 3 to 30 carbon atoms, or an aralkyl group having 7 to 30 carbon atoms, B represents a substituted or unsubstituted alkylene oxide group, and q is an integer of 2 to 50.

(IX-b)

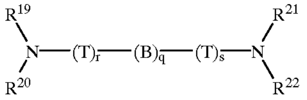

wherein B and q have the same meanings as defined in the above formula (IX-a), $R^{19}$ to $R^{22}$ are have the same meaning as $R^{17}$ and $R^{18}$ defined in the above formula (IX-a), T represents a divalent linking group such as an alkylene group and an arylene group, and the linking group may include at least one of a hetero atom such as an oxygen atom (—O—), nitrogen atom (—NH—), sulfur atom (—S—), etc., and the nitrogen atom may have at least one substituent such as an alkyl group, amino group, etc., and r and s are each 0 or 1.

$$Y^1\text{-}[(T')_r\text{-}(B)_q—Y^2]_u \qquad (IX\text{-}c)$$

wherein B and q have the same meanings as defined in the above formula (IX-a), $Y^1$ and $Y^2$ each represent a substituted or unsubstituted amino group, ammonium group or a group having a basic nitrogen atom such as a nitrogen-containing heterocyclic group, provided that at least one of $Y^1$ and $Y^2$ is a group having a basic nitrogen atom, T' represents a divalent linking group comprising an atom or a group of atoms selected from the group consisting of a hydrogen atom, carbon atom, nitrogen atom, oxygen atom and sulfur atom, t is 0 or 1, and u is 1, 2 or 3.
Specific examples of the amino compounds to be used in the present invention are shown below.
(IX-a-1)
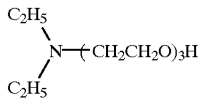
(IX-a-2)
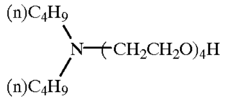
(IX-a-3)
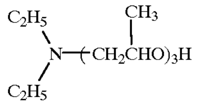
(IX-a-4)
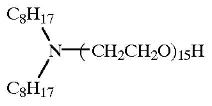
(IX-a-5)
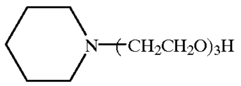
(IX-a-6)
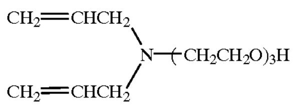
(IX-b-1)
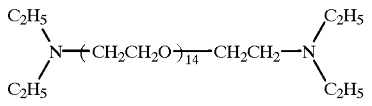
(IX-b-2)
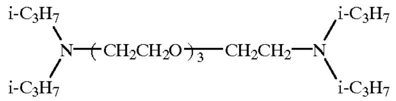
(IX-b-3)
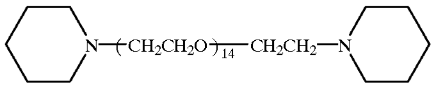
(IX-b-4)
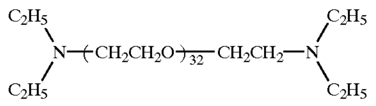
(IX-b-5)
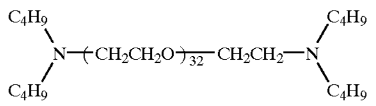
-continued
(IX-b-6)
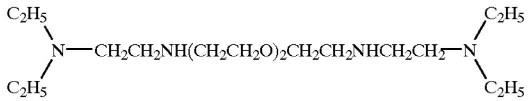
(IX-b-7)
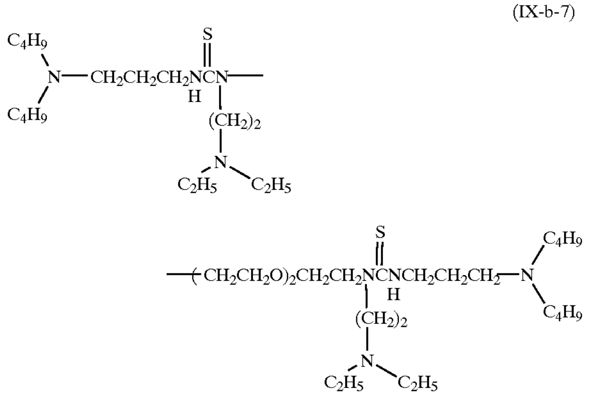
(IX-b-8)
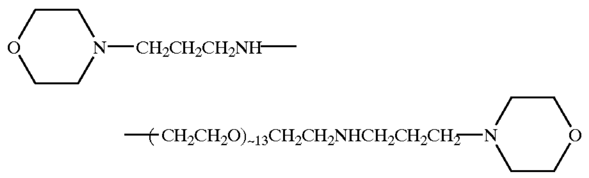
(IX-c-1)
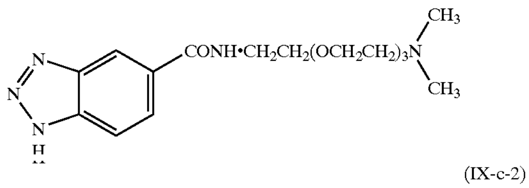
(IX-c-2)
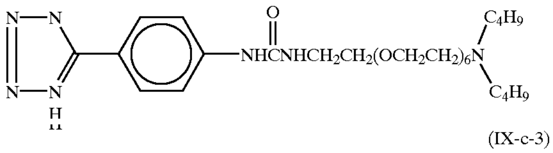
(IX-c-3)
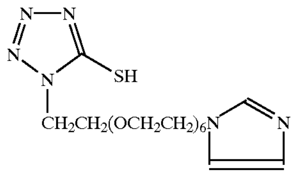
(IX-c-4)
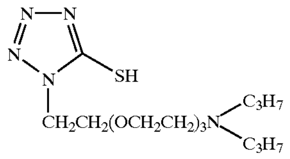
(IX-c-5)
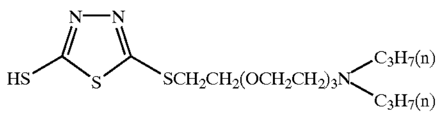

-continued (IX-c-6)

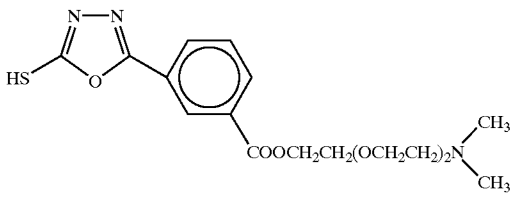

An amount of the amine or the amino compound in the ink-receptive layer of the present invention is preferably about 0.1 to about 50 $mmol/m^2$, more preferably about 0.2 to about 20 $mmol/m^2$.

In Japanese Provisional Patent Publication No. 276790/1995, there is disclosed that drying property or curling property can be improved by using monosaccharide or oligosaccharide, and in Japanese Provisional Patent Publication No. 108617/1996, there is disclosed that bleeding of ink can be prevented by using a water-soluble polysaccharide. In the present invention, however, it has found that water resistance, light resistance and gas resistance can be simultaneously satisfied with extremely high levels by the ink-jet recording material having a void layer with a specific surface pH range, which contains fumed silica fine particles as well as the cationic compound and the saccharide.

The saccharide to be used in the present invention may include a polysaccharide, an oligosaccharide and a monosaccharide. As the polysaccharide, there may be mentioned, for example, cellulose, hydroxyethyl cellulose, methylhydroxypropyl cellulose, methyl cellulose, carboxymethyl cellulose, quinseed, carrageenan, pectin, mannan, curdlan, starch, gum Arabic, tragacanth gum, xanthene gum, guar gum, dextrane, low cast bean gum, chitin, chitosan, agar, alginic acid, cyrume, jurane gum, peach gum, pullulan, tamarind seed gum, etc.

The saccharide to be preferably used in the present invention is a saccharide containing a component with a polymerization degree of 15 or less in an amount of 50% by weight or more, more preferably a saccharide containing a component with a polymerization degree of 10 or less in an amount of 50% by weight or more. In this case, it may be single component of a monosaccharide or an oligosaccharide (2 to 6-saccharide). As the above-mentioned low polymerization degree saccharide, there may be mentioned, for example, reduced maltose starch syrup mainly comprising maltitol prepared by using maltose obtained by enzymolysis of starch as a starting material and reducing the same. These are commercially available from K.K. Hayashibara Shoji, Japan, under the trade names of reduced starch syrup Amameal, Ditto HS-40, reduced maltose starch syrup Mabit, Ditto Mabit C, Maltodextrin (Sandec #150, #180), etc.

The monosaccharide to be used in the present invention is a general term of an aldehyde or ketone of a polyalcohol represented by the formula $C_n(H_2O)_n$ where n>3 and cannot be hydrolyzed any more. The oligosaccharide is positioned between the monosaccharide and the polysaccharide, and two to six molecules of the monosaccharides are bonded, which causes the same number of the monosaccharides by hydrolysis.

Examples of the monosaccharide may include, for example, L-arabinose, D-xylose, D-ribose, D-glucose, D-mannose, D-galactose, D-fructose, and the like. Examples of the oligosaccharide may include, for example, maltose, cellobiose, trehalose, gentiobiose, isomaltose, lactose, sucrose, raffinose, gentianose, stachyose, and the like.

An amount of the saccharide in the ink-receptive layer of the present invention is preferably about 0.1 to about 50 $mmol/m^2$, more preferably about 0.2 to about 20 $mmol/m^2$. When polyvinyl alcohol is used, the saccharide is preferably contained in an amount of about 0.1 to about 40% by weight, more preferably in the range of about 1 to about 20% by weight based on the amount of the polyvinyl alcohol. If the amount exceeds the above range, ink-receptive property is lowered in some cases, and if it is less than the above, an effect of improving preservability after printing becomes small.

In the present invention, two or more compounds selected from the group consisting of the above-mentioned sulfur-containing compound having no mercapto group, amine or amino compound, and saccharide may be used. It is more preferred to use the sulfur-containing compound having no mercapto group and the saccharide, or the sulfur-containing compound having no mercapto group and the amine or amino compound in combination since preservability is further improved.

The ink-receptive layer of the present invention contains the cationic compound. By using the cationic compound in combination with at least one of the above-mentioned compounds, preservability such as water resistance, gas resistance and light resistance can be markedly improved.

A cationic polymer is preferably added to the fumed silica-containing layer of the present invention. As the cationic polymers to be used in the present invention, there may be preferably mentioned polyethyleneimine, polydiallylamine, polyallylamine, polyalkylamine, as well as polymers having a primary to tertiary amino group or a quaternary ammonium group as disclosed in Japanese Provisional Patent Publications No. 20696/1984, No. 33176/1984, No. 33177/1984, No. 155088/1984, No. 11389/1985, No. 49990/1985, No. 83882/1985, No. 109894/1985, No. 198493/1987, No. 49478/1988, No. 115780/1988, No. 280681/1988, No. 40371/1989, No. 234268/1994, No. 125411/1995 and No. 193776/1998, etc. A weight average molecular weight (Mw) of these cationic polymers to be used in the present invention is preferably about 1,000 or more, more preferably about 2,000 to about 100,000.

An amount of these cationic polymers is preferably about 1 to about 10% by weight, more preferably about 2 to about 7% by weight based on the amount of the fumed silica.

The water-soluble metallic compound to be used in the present invention may include, for example, as a water-soluble polyvalent metallic salt, a water-soluble salt of a metal selected from the group consisting of calcium, barium, manganese, copper, cobalt, nickel, aluminum, iron, zinc, zirconium, titanium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, titanium chloride, titanium sulfate, zirconium acetate, zirconium chloride, zirconium oxychloride, zirconium hydroxychloride, zirconium nitrate, basic zirconium carbonate, zirconium hydroxide, ammonium zirconium carbonate, potassium zirconium carbonate, zirconium sulfate, zirconium fluoride, chromium acetate, chromium acetate, chromium sulfate, magnesium sulfate, magnesium chloride hexahydrate, magnesium citrate nonahydrate, sodium phosphorus wolframate, tungsten sodium citrate, dodecawolframatophosphate hydrate, dodecawolframato-silicate 26 hydrate, molybdenum chloride, dodecamolyb-datephosphate n hydrate, etc.

In the present invention, a water-soluble aluminum compound or a water-soluble compound containing an element of Group 4A of the periodic table is particularly preferred. The water-soluble aluminum compound may include, for example, aluminum chloride and its hydrate, aluminum sulfate and its hydrate, aluminum alum, etc. as an inorganic salt. Moreover, there is a basic aluminum hydroxide compound which is an inorganic aluminum-containing cationic polymer. Of these, a basic poly(aluminum hydroxide) compound is particularly preferred.

The above-mentioned polyaluminum hydroxychloride compound is a water-soluble poly(aluminum hydroxide) which comprises, as its main component, at least one of those represented by the following formulae (1) to (3) and containing a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

$$[Al_2(OH)_nCl_{6-n}]_m \quad (1)$$

$$[Al(OH)_3]_nAlCl_3 \quad (2)$$

$$Al_n(OH)_mCl_{(3n-m)}\ 0<m<3n \quad (3)$$

These water-soluble aluminum compounds are commercially available from Taki Chemical, K.K., Japan under the name of poly(aluminum chloride) (PAC, trade name) as a water treatment agent, from Asada Chemical K.K., Japan under the name of poly(aluminum hydroxide) (Paho, trade name), from K.K. Riken Green, Japan under the name of Pyurakemu WT (trade name) and other manufacturers with the same objects whereby various kinds of different grade can be easily obtained.

The water-soluble compound containing an element of Group 4A is not specifically limited so long as it is water-soluble, and a water-soluble compound containing titanium or zirconium is preferred. For example, as the water-soluble compound containing titanium, there may be mentioned titanium sulfate, and as the water-soluble compound containing zirconium, there may be mentioned zirconium acetate, zirconium chloride, zirconium oxychloride, zirconium hydroxychloride, zirconium nitrate, basic zirconium carbonate, zirconium hydroxide, ammonium zirconium carbonate, potassium zirconium carbonate, zirconium sulfate, zirconium fluoride, and the like. Of these compounds, there is a compound having too low pH. In such a case, it may be used by optionally adjusting the pH of the compound. In the present invention, the term "water-soluble" means that the compound is dissolved in water in an amount of 1% by weight or more at normal temperature and under normal pressure.

In the present invention, an amount of the above-mentioned water-soluble metal compound is preferably about 0.1 to 10% by weight, more preferably about 1 to about 5% by weight based on the amount of the fumed silica.

The above-mentioned cationic compound may be used two or more compounds in combination. For example, it is preferred to use the cationic polymer and the water-soluble metal compound in combination.

In the present invention, the surface pH of the ink-receptive layer containing fumed silica is 3 to 6, particularly preferably about 3 to about 5. By making the surface pH of the ink-receptive layer containing the above-mentioned fumed silica as well as the cationic compound and at least one of the specific compounds as mentioned above of the present invention, preservability of the printed material after printing can be markedly improved. When either one of the cationic compound and at least one of the specific compounds as mentioned above is missing from the ink-receptive layer, preservability is markedly lowered. The surface pH of the ink-receptive layer is a surface pH obtained by dropping distilled water on the surface of the ink-receptive layer and measuring the pH at the distilled water portion after 30 seconds from dropping according to the method of J.TAPPI paper pulp testing method No. 49.

The surface pH of the ink-receptive layer is preferably adjusted in the state of the coating solution, but the pH of the coating solution and the surface pH of the dried film are not necessarily accorded with each other. Thus, it is necessary to previously obtain the relationship between the pH of the coating solution and that of the dried film using the coating solution by experiments to make the surface pH predetermined value. The pH of the coating solution for forming the ink-receptive layer can be adjusted by suitably using an acid and/or an alkali. As the acid to be used, there may be mentioned an inorganic acid such as hydrochloric acid, nitric acid, sulfuric acid, phosphoric acid, etc., and an organic acid such as acetic acid, citric acid, succinic acid, etc. As the alkali, there may be used sodium hydroxide, aqueous ammonia, potassium carbonate, trisodium phosphate, and as a weak alkali, an alkali metal salt of a weak acid such as sodium acetate, etc.

The ink-receptive layer of the present invention may further contain various kinds of oil droplets to improve brittleness of a film. As such oil droplets, there may be mentioned a hydrophobic organic solvent having a high boiling point (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxyethyl methacrylate, etc. is polymerized) each having a solubility in water at room temperature of 0.01% by weight or less. Such oil droplets can be used in an amount in the range of about 10 to about 50% by weight based on the amount of the hydrophilic binder.

In the present invention, a surfactant may be contained in the ink-receptive layer. The surfactant to be used may include either of a cationic, nonionic or betain type surfactant which may be a low molecular weight or a high molecular weight. At least one surfactant may be added to a coating solution for forming the ink-receptive layer. When two or more surfactants are used in combination, it is not preferred to use an anionic type and a cationic type surfactant. An amount of the surfactant is preferably about 0.001 to about 5 g, more preferably about 0.01 to about 3 g per 100 g of the binder constituting the ink-receptive layer.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH controller, etc. may be added.

A support to be used in the present invention may preferably be a water resistant support. As the water resistant support to be used in the present invention, there may be mentioned, for example, a plastic resin film such as a polyester resin including polyethylene terephthalate; a diacetate resin; a triacetate resin; an acryl resin; a polycarbonate resin; a polyvinyl chloride; a polyimide resin; cellophane; celluloid; etc., a resin coated paper in which a polyolefin resin is laminated on the both surfaces of paper, and the like. A thickness of the water resistant support to be used in the present invention is preferably about 50 $\mu$m to about 300 $\mu$m.

A base paper constituting the resin-coated paper to be preferably used in the present invention is not particularly limited, and any paper generally used may be employed. More preferably a smooth base paper such as that used as paper for a photographic support may be used. As pulp for constituting the basepaper, naturalpulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the sheet.

A thickness of the base paper is not particularly limited, and preferably that having a good surface smoothness prepared by compressing paper during paper-making or after paper-making by applying pressure using a calender, etc. Abasis weight thereof is preferably 30 to 250 g/m$^2$.

As a resin of the resin-coated paper, a polyolefin resin or a resin which cures by irradiation of electronic rays may be used. The polyolefin resin may include a homopolymer of an olefin such as low density polyethylene, high density polyethylene, polypropylene, polybutene, polypentene, etc.; a copolymer comprising two or more olefins such as an ethylene-propylene copolymer, etc.; or a mixture thereof, and these polymers having various densities and melt viscosity indexes (melt index) may be used singly or in combination of two or more.

Also, to the resin of the resin-coated paper, various kinds of additives including a white pigment such as titanium oxide, zinc oxide, talc, calcium carbonate, etc.; an aliphatic amide such as stearic amide, arachidamide, etc.; an aliphatic acid metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet, etc.; a fluorescent brightener, an UV absorber, etc. may be preferably added optionally combining two or more.

The resin-coated paper to be preferably used in the present invention can be prepared, in the case of using a polyolefin resin, by casting a melted resin under heating on a running base paper, which is so-called the extrusion coating method, whereby the both surfaces of the base paper are coated by the resin. In the case of using a resin which cures by irradiation of electronic rays, the resin is coated on a base paper by means of a coater conventionally used such as a gravure coater, a blade coater, etc., then, electronic rays are irradiated to the resin whereby coating the base paper with the resin. Also, it is preferred to subject an activation treatment to a base paper before coating the resin to the base paper, such as a corona discharge treatment, a flame treatment, etc. The surface (the front surface) on which an ink-receptive layer is to be coated of the support is a gloss surface or a matte surface depending on the purposes, and particularly, a gloss surface is predominantly used. It is not necessarily subjected to resin coating at the back surface of the base paper, but in view of preventing curl, it is preferred to coat the surface of the base paper with the resin. The back surface is usually a non-gloss surface, and if necessary, the activation treatment such as the corona discharge treatment, the flame treatment, etc. may be applied to the front surface or to the both surfaces of the front and back surfaces. Also, a thickness of the resin layer is not particularly limited, and is generally in the range of about 5 to about 50 $\mu$m on the front surface or both of the front and back surfaces.

To the support of the present invention, various kinds of back coating layer(s) may be provided for the purpose of providing antistatic property, conveying property, anticurl property, etc. to the support. In the back coating layer, an inorganic antistatic agent, an organic antistatic agent, a hydrophilic binder, a latex, a curing agent, a pigment, a surfactant, etc. may be included in optional combination.

In the present invention, the coating method of the ink-receptive layer is not particularly limited, and a coating method conventionally known in the art may be used. For example, there may be mentioned a slidelip system, a curtain system, an extrusion system, an air knife system, a roll coating system, a rod bar coating system, etc.

To the ink-jet recording material of the present invention, in addition to the layer containing fumed silica (this layer may comprise two or more layers), an ink-absorbing layer, an ink-fixing layer, an intermediate layer, a protective layer, etc., may be further provided. For example, a water-soluble polymer layer may be provided as an under layer or a swelling layer may be provided as an upper layer.

EXAMPLES

In the following, the present invention is explained in more detail by referring to Examples, but the present invention is not limited by these Examples.

Example 1

On the front surface of a base paper comprising a pulp formulation of a bleached kraft pulp of hardwood (LBKP, 50 parts) and a bleached sulfite pulp of hardwood (LBSP, 50 parts) with 120 g/m$^2$ as a support was coated a resin composition comprising a low densitypolyethylene (70 parts), a high density polyethylene (20 parts) and titanium oxide (10 parts) in an amount of 25 g/m$^2$, and a resin composition comprising a high density polyethylene (50 parts) and a low density polyethylene (50 parts) was coated on the back surface of the same in an amount of 25 g/m$^2$ to prepare a resin coated paper.

On the above-mentioned support was coated the following coating solution for an ink-receptive layer so that the coated amount of the fumed silica was 18 g/m$^2$ and dried to prepare various kinds of ink-jet recording sheets. Incidentally, every recording sheets were so adjusted that the surface pH of the ink-receptive layer became 4.2.

<Recording Sheet 1>

| | |
|---|---|
| Fumed silica<br>(Average primary particle size: 7 nm, Specific surface area by the BET method: 300 $m^2$/g) | 100 parts |
| Polyvinyl alcohol<br>(PVA235, trade name, available from K.K. Kuraray, Japan, Saponification degree: 88%, Average polymerization degree: 3,500) | 23 parts |
| Boric acid | 4 parts |
| Amphoteric surfactant<br>(SWAM AM-2150, trade name, available from Nippon Surfactant, Japan) | 0.3 part |

<Recording Sheet 2>

An amount of the polyvinyl alcohol of the above-mentioned Recording sheet 1 was increased to 46 parts.

<Recording Sheet 3>

To the ink-receptive layer of the above-mentioned Recording sheet 1, the following compound represented by the formula (a) was added so that it was contained in an amount of 10 mmol/$m^2$.

(a)

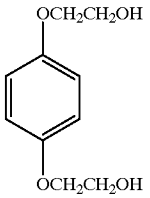

<Recording Sheet 4>

To the ink-receptive layer of the above-mentioned Recording sheet 1, the following compound represented by the formula (b) was added so that it was contained in an amount of 10 mmol/$m^2$.

(b)

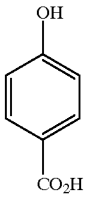

<Recording Sheet 5>

To the ink-receptive layer of the above-mentioned Recording sheet 1, the following compound represented by the formula (c) was added so that it was contained in an amount of 10 mmol/$m^2$.

(c)

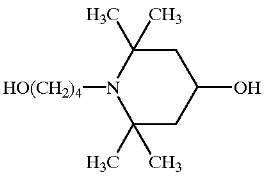

<Recording Sheet 6>

To the ink-receptive layer of the above-mentioned Recording sheet 1, ascorbic acid was added so that it was contained in an amount of 10 mmol/$m^2$.

To the coating solution for forming the ink-receptive layer used in Recording sheet 1 were added 3 parts of diallylamine hydrochloride-sulfur dioxide copolymerized product (PAS-92, trade name, available from Nittobo K.K., Japan) as the cationic compound and the specific compound of the present invention as mentioned below, Recording sheets 7A to 11A were prepared. Also, to the same solution were added 3 parts of basic polyaluminum hydroxide (Pyurakemu WT, trade name, available from Riken Green K.K., Japan) in place of the diallylamine hydrochloride-sulfur dioxide copolymerized product, and the specific compound of the present invention as mentioned below, Recording sheets 7B to 11B were prepared.

<Recording Sheets 7A and 7B>

To the ink-receptive layer was added the compound represented by the formula (I-1) as mentioned above so that it was contained in an amount of 10 mmol/$m^2$.

<Recording Sheets 8A and 8B>

To the ink-receptive layer was added the compound represented by the formula (I-7) as mentioned above so that it was contained in an amount of 10 mmol/$m^2$.

<Recording Sheets 9A and 9B>

To the ink-receptive layer was added the compound represented by the formula (II-4) as mentioned above so that it was contained in an amount of 10 mmol/$m^2$.

<Recording Sheets 10A and 10B>

To the ink-receptive layer was added the compound represented by the formula (II-9) as mentioned above so that it was contained in an amount of 10 mmol/$m^2$.

<Recording Sheets 11A and 11B>

To the ink-receptive layer was added the compound represented by the formula (III-1) as mentioned above so that it was contained in an amount of 10 mmol/$m^2$.

With regard to the respective ink-jet recording sheets thus obtained, ink-absorption property, preservability (light resistance and gas resistance) after printing, and glossiness were evaluated. The results are shown in Table 1.

<Ink-absorption Property>

By using an ink-jet printer (PM-770C, trade name, available from Seiko Epson K.K., Japan), C (cyan), M (magenta) and Y (yellow) were each printed with 100%, and immediately after the printing, a PPC paper was overlapped over the printed portion with a slight pressurization, and the degree of an amount of the ink transferred to the PPC paper was observed with naked eyes and evaluated by the following standards.

○: No transfer was observed.

X: Transfer was occurred.

<Light Resistance>

Byusingan ink-jet printer (PM-770C, trade name, available from Seiko Epson K.K., Japan), C, M, Y and K (black) were each solid printed, and after irradiating light of 60 W/$m^2$ to the printed materials for 30 hours by Sun Test CPS light-fading test machine (trade name) manufactured by Atlas K.K., Japan. Thereafter, the density at the printed portion was measured and the image remaining ratio (density after irradiation/density before irradiation) was obtained. Among the C, M, Y and K images, the lowest remaining ratio was shown in Table 1.

<Gas Resistance>

Printing was carried out in the same manner as in the above-mentioned light resistance test, and after exposing the material in air at room temperature for 3 months, the density at the printed portion was measured. The image remaining ratio (density after exposure/density before exposure) was obtained, and among the C, M, Y and K images, the lowest remaining ratio was shown in Table 1.

<Glossiness>

Glossiness was measured according to the method described in JIS 142 (Testing method for 750 specular glossiness of paper and board).

TABLE 1

| Recording sheet | Ink-absorption property | Preservability (%) Light resistance | Gas resistance | Remarks |
|---|---|---|---|---|
| 1 | ○ | 70 | 68 | Comparative |
| 2 | X | 72 | 80 | Comparative |
| 3 | ○ | 78 | 70 | Comparative |
| 4 | ○ | 77 | 72 | Comparative |
| 5 | ○ | 76 | 71 | Comparative |
| 6 | ○ | 75 | 73 | Comparative |
| 7A | ○ | 83 | 94 | This invention |
| 8A | ○ | 83 | 93 | This invention |
| 9A | ○ | 84 | 94 | This invention |
| 10A | ○ | 81 | 94 | This invention |
| 11A | ○ | 82 | 90 | This invention |
| 7B | ○ | 92 | 97 | This invention |
| 8B | ○ | 92 | 97 | This invention |
| 9B | ○ | 91 | 98 | This invention |
| 10B | ○ | 90 | 96 | This invention |
| 11B | ○ | 91 | 91 | This invention |

Glossiness was 60 to 65% in each recording sheet and high glossiness was shown.

As can be clearly seen from the above results, preservability was improved while maintaining high ink-absorption property by using the cationic compound and the specific compound of the present invention in combination. That is, by reducing the amount of polyvinyl alcohol which is a water-soluble binder, the ink-absorption property is improved but the preservability, particularly gas resistance is markedly lowered. In the present invention, the ink-absorption property and preservability are simultaneously improved and a photo-like high glossiness can be obtained.

Example 2

In the same manner as in Example 1 except for changing the fumed silica used in Example 1 to the fumed silica having an average primary particle size of 30 nm, the same experiments were carried out. As a result, substantially the same results can be obtained with regard to the ink absorption property and preservability but glossiness was lowered about 5 to 10% than those of Example 1.

Example 3

Recording sheet 101 was prepared in the same manner as in Recording sheet 1 of Example 1 except for changing the amount of the polyvinyl alcohol in the coating solution for the ink-receptive layer from 23 parts to 28 parts, and the coating solution was so coated that the coated amount of the fumed silica became 18 $g/m^2$ in the solid content and dried. Incidentally, every recording sheets were so adjusted to become the pH at the surface of the ink-receptive layer of 4.2.

<Recording Sheet 102>

An amount of the polyvinyl alcohol of the above-mentioned Recording sheet 101 was increased to 45 parts.

<Recording Sheet 103>

To the ink-receptive layer of the above-mentioned Recording sheet 101, the above-mentioned compound represented by the formula (a) was added so that it was contained in an amount of 5 $mmol/m^2$.

<Recording Sheet 104>

To the ink-receptive layer of the above-mentioned Recording sheet 101, the above-mentioned compound represented by the formula (b) was added so that it was contained in an amount of 5 $mmol/m^2$.

<Recording Sheet 105>

To the ink-receptive layer of the-above-mentioned Recording sheet 101, the above-mentioned compound represented by the formula (c) was added so that it was contained in an amount of 5 $mmol/m^2$.

To the coating solution for forming the ink-receptive layer used in Recording sheet 101 were added each 2 parts of diallylamine hydrochloride-sulfur dioxide copolymerized product (PAS-92, trade name, available from Nittobo K.K., Japan) and basic polyaluminum hydroxide (Pyurakemu WT, trade name, available from Riken Green K-K., Japan) as the cationic compounds, and the specific compound of the present invention as mentioned below, Recording sheets 106 to 108 were prepared <Recording Sheet 106>

To the ink-receptive layer of the above-mentioned Recording sheet 101, the above-mentioned compound represented by the formula (IV-a) (ADK STAB AO-23, trade name, available from Asahi Denka Kogyo, Japan) was added so that it was contained in an amount of 5 $mmol/m^2$.

<Recording Sheet 107>

To the ink-receptive layer of the above-mentioned Recording sheet 101, the above-mentioned compound represented by the formula (IV-b) (SEENOX B.C.S, trade name, available from Spiro Kasei, Japan) was added so that it was contained in an amount of 5 $mmol/m^2$.

<Recording Sheet 108>

To the ink-receptive layer of the above-mentioned Recording sheet 101, the above-mentioned compound represented by the formula (IV-e) (ADK STAB AO-412S, trade name, available from Asahi Denka Kogyo, Japan) was added so that it was contained in an amount of 5 $mmol/m^2$.

With regard to the obtained respective ink-jet recording sheets, ink-absorption property, preservability (light resistance and gas resistance) after printing, and glossiness were evaluated in the same manner as in Example 1. The results are shown in Table 2.

TABLE 2

| Recording sheet | Ink-absorption property | Preservability (%) Light resistance | Gas resistance | Remarks |
|---|---|---|---|---|
| 101 | ○ | 71 | 72 | Comparative |
| 102 | X | 74 | 80 | Comparative |
| 103 | ○ | 80 | 73 | Comparative |
| 104 | ○ | 79 | 74 | Comparative |
| 105 | ○ | 78 | 74 | Comparative |
| 106 | ○ | 80 | 87 | This invention |
| 107 | ○ | 82 | 90 | This invention |
| 108 | ○ | 81 | 88 | This invention |

Glossiness was 60 to 65% in each recording sheet and high glossiness was shown.

As can be clearly seen from the above results, preservability was improved while maintaining high ink-absorption property by using the cationic compound and the specific compound of the present invention in combination. That is, in the present invention, the ink-absorption property and preservability are simultaneously improved and a photo-like high glossiness can be obtained.

Example 4

Recording sheet 201 was prepared in the same manner as in Recording sheet 1 of Example 1 except for changing the composition of the coating solution for the ink-receptive layer as mentioned below, and the coating solution was so coated that the coated amount of the fumed silica became 18 $g/m^2$in the solid content and dried. Incidentally, every recording sheets were so adjusted to become the pH at the surface of the ink-receptive layer of 4.0.

<Recording Sheet 201>

| | |
|---|---|
| Fumed silica (Average primary particle size: 7 nm, Specific surface area by the BET method: 300 $m^2/g$) | 100 parts |
| Polyvinyl alcohol (PVA235, trade name, available from K.K. Kuraray, Japan, Saponification degree: 88%, Average polymerization degree: 3,500) | 25 parts |
| Boric acid | 4 parts |
| Diallylamine hydrochloride-sulfur dioxide copolymerized product (PAS-92, trade name, available from Nittobo K.K., Japan) | 3 parts |
| Basic polyaluminum hydroxide (Pyurakemu WT, trade name, available from Riken Green K.K., Japan) | 3 parts |
| Amphoteric surfactant (SWAM AM-2150, trade name, available from Nippon Surfactant, Japan) | 0.3 part |

<Recording Sheet 202>

To the ink-receptive layer of the above-mentioned Recording sheet 201, the above-mentioned compound represented by the formula (a) was added so that it was contained in an amount of 5 $mmol/m^2$.

<Recording Sheet 203>

To the ink-receptive layer of the above-mentioned Recording sheet 201, the above-mentioned compound represented by the formula (b) was added so that it was contained in an amount of 5 $mmol/m^2$.

<Recording Sheet 204>

To the ink-receptive layer of the above-mentioned Recording sheet 201, the above-mentioned compound represented by the formula (V-3) was added so that it was contained in an amount of 5 $mmol/m^2$.

<Recording Sheet 205>

To the ink-receptive layer of the above-mentioned Recording sheet 201, the above-mentioned compound represented by the formula (v-5) was added so that it was contained in an amount of 5 $mmol/m^2$.

<Recording Sheet 206>

To the ink-receptive layer of the above-mentioned Recording sheet 201, the above-mentioned compound represented by the formula (V-8) was added so that it was contained in an amount of 5 $mmol/m^2$ <Recording Sheet 207>

To the ink-receptive layer of the above-mentioned Recording sheet 201, the above-mentioned compound represented by the formula (V-10) was added so that it was contained in an amount of 5 $mmol/m^2$.

<Recording Sheet 208>

To the ink-receptive layer of the above-mentioned Recording sheet 201, the above-mentioned compound represented by the formula (V-11) was added so that it was contained in an amount of 5 $Mmol/m^2$.

With regard to the obtained respective ink-jet recording sheets, ink-absorption property, preservability (light resistance and gas resistance) after printing, and glossiness were evaluated in the same manner as in Example 1. The results are shown in Table 3.

<Water Resistance>

Fine lines with a width of 100 μm were printed with an interval of 100 μm, and after allowing to stand for one day, the printed material was allowed to stand under the conditions of 35° C. and 90% relative humidity (RH) for 2 days and blur of fine lines was evaluated according to the following standards.

○: Substantially no blur was observed and the intervals between the fine lines are clear.

Δ: There is some blur but the intervals between fine lines are not completely connected.

X: Fine lines are blurred and there is no interval between fine lines.

TABLE 3

| | | | Preservability (%) | | |
|---|---|---|---|---|---|
| Recording sheet | Ink-absorption property | Water resistance | Light resistance | Gas resistance | Remarks |
| 201 | ○ | ○ | 76 | 77 | Comparative |
| 202 | ○ | ○ | 85 | 78 | Comparative |
| 203 | ○ | ○ | 83 | 79 | Comparative |
| 204 | ○ | ○ | 91 | 90 | This invention |
| 205 | ○ | ○ | 93 | 92 | This invention |
| 206 | ○ | ○ | 95 | 98 | This invention |
| 207 | ○ | ○ | 92 | 95 | This invention |
| 208 | ○ | ○ | 93 | 94 | This invention |

Glossiness was 60 to 65% in each recording sheet and high glossiness was shown.

As can be clearly seen from the above results, preservability was improved while maintaining high ink-absorption property and water resistance by using the cationic compound and the specific compound of the present invention in combination. That is, in the present invention, the ink-absorption property and preservability are simultaneously improved and a photo-like high glossiness can be obtained.

Example 5

In the same manner as in Example 4 except for changing the fumed silica used in Example 4 to the fumed silica having an average primary particle size of 15 nm, the same experiments were carried out. As a result, substantially the same results can be obtained with regard to the ink absorption property and preservability but glossiness was lowered about 3 to 6% than those of Example 4.

Example 6

In Recording sheet 206 prepared in Example 4, samples in which the surface pH was adjusted to 4.5 (Recording sheet 209), 5.5 (Recording sheet 210), and 6.5 (Recording sheet 211) were prepared and evaluated in the same manner as in Example 4. The results are shown in Table 4. Glossiness was 60 to 65% in each Recording sheet and high glossiness was shown. In Recording sheet 211 in which the surface pH was 6.5, water resistance was markedly lowered.

TABLE 4

| Recording sheet | Surface pH | Ink absorp-tion prop-erty | Water resist-ance | Preservability (%) Light resist-ance | Gas resist-ance | Remarks |
|---|---|---|---|---|---|---|
| 206 | 4.0 | ○ | ○ | 95 | 98 | This in-vention |
| 209 | 4.5 | ○ | ○ | 97 | 95 | This in-vention |
| 210 | 5.5 | ○ | Δ | 98 | 90 | This in-vention |
| 211 | 6.5 | ○ | X | 97 | 78 | Compar-ative |

Example 7

In the same manner as in Recording sheets 201, 202 and 203 prepared in Example 4, Recording sheets 301, 302 and 303 were prepared. Incidentally, each Recording sheet was adjusted its surface pH of the ink-receptive layer to 4.0.

<Recording Sheet 304>

To the ink-receptive layer of the above-mentioned Recording sheet 301, the above-mentioned compound represented by the formula (VI-3) was added so that it was contained in an amount of 5 mmol/$m^2$.

<Recording Sheet 305>

To the ink-receptive layer of the above-mentioned Recording sheet 301, the above-mentioned compound represented by the formula (VI-5) was added so that it was contained in an amount of 5 mmol/$m^2$.

<Recording Sheet 306>

To the ink-receptive layer of the above-mentioned Recording sheet 301, the above-mentioned compound represented by the formula (VI-8) was added so that it was contained in an amount of 5 mmol/$m^2$.

<Recording Sheet 307>

To the ink-receptive layer of the above-mentioned Recording sheet 301, the above-mentioned compound represented by the formula (VI-13) was added so that it was contained in an amount of 5 mmol/$m^2$ <Recording Sheet 308>

To the ink-receptive layer of the above-mentioned Recording sheet 301, the above-mentioned compound represented by the formula (VI-14) was added so that it was contained in an amount of 5 mmol/$m^2$.

With regard to the obtained respective ink-jet recording sheets, ink-absorption property, preservability (light resistance and gas resistance) after printing, and glossiness were evaluated in the same manner as in Example 4. The results are shown in Table 5.

TABLE 5

| Recording sheet | Ink-absorption property | Water resist-ance | Preservability (%) Light resist-ance | Gas resist-ance | Remarks |
|---|---|---|---|---|---|
| 301 | ○ | ○ | 74 | 75 | Compar-ative |
| 302 | ○ | ○ | 80 | 78 | Compar-ative |
| 303 | ○ | ○ | 82 | 79 | Compar-ative |
| 304 | ○ | ○ | 93 | 99 | This in-vention |
| 305 | ○ | ○ | 94 | 99 | This in-vention |
| 306 | ○ | ○ | 93 | 98 | This in-vention |
| 307 | ○ | ○ | 92 | 98 | This in-vention |
| 308 | ○ | ○ | 95 | 99 | This in-vention |

Glossiness was 60 to 65% in each recording sheet and high glossiness was shown. In Recording sheet 302, minute crack is formed but no crack was admitted in the other Recording sheets.

As can be clearly seen from the above results, preservability was improved while maintaining high ink-absorption property and water resistance by using the cationic compound and the thiourea compound of the present invention in combination. That is, in the present invention, the ink-absorption property and preservability are simultaneously improved and a photo-like high glossiness can be obtained.

Example 8

In the same manner as in Example 7 except for changing the fumed silica used in Example 7 to the fumed silica having an average primary particle size of 15 nm, the same experiments were carried out. As a result, substantially the same results can be obtained with regard to the ink absorption property and preservability but glossiness was lowered about 3 to 6% than those of Example 7.

Example 9

In Recording sheet 308 prepared in Example 7, samples in which the surface pH was adjusted to 4.5 (Recording sheet 309), 5.5 (Recording sheet 310), and 6.5 (Recording sheet 311) were prepared. Also, Recording sheet 312 was prepared by removing the cationic compound from Recording sheet 308. These samples were evaluated in the same manner as in Example 7. The results are shown in Table 6. Glossiness was 60 to 65% in each Recording sheet and high glossiness was shown. In Recording sheet 311 in which the surface pH was 6.5, water resistance was markedly lowered. Recording sheet 312 from which the cationic compound had been removed was markedly lowered in preservability.

TABLE 6

| Recording sheet | Surface pH | Ink absorp-tion prop-erty | Water resist-ance | Preservability (%) Light resist-ance | Gas resist-ance | Remarks |
|---|---|---|---|---|---|---|
| 308 | 4.0 | ○ | ○ | 95 | 99 | This in-vention |
| 309 | 4.5 | ○ | ○ | 95 | 97 | This in-vention |

TABLE 6-continued

| Recording sheet | Surface pH | Ink absorption property | Water resistance | Preservability (%) Light resistance | Gas resistance | Remarks |
|---|---|---|---|---|---|---|
| 310 | 5.5 | ○ | Δ | 96 | 92 | This invention |
| 311 | 6.5 | ○ | X | 98 | 81 | Comparative |
| 312 | 4.0 | ○ | Δ | 82 | 85 | Comparative |

Example 10

Recording sheet 401 was prepared in the same manner as in Recording sheet 1 of Example 1 except for changing the composition of the coating solution for the ink-receptive layer as mentioned below, and the coating solution was so coated that the coated amount of the fumed silica became 18 $g/m^2$ in the solid content and dried. Incidentally, every recording sheets were so adjusted to become the pH at the surface of the ink-receptive layer of 4.2.

<Recording Sheet 401>

| | |
|---|---|
| Fumed silica (Average primary particle size: 7 nm, Specific surface area by the BET method: 300 $m^2/g$) | 100 parts |
| Polyvinyl alcohol (PVA235, trade name, available from K.K. Kuraray, Japan, Saponification degree: 88%, Average polymerization degree: 3,500) | 25 parts |
| Diallylamine hydrochloride-sulfur dioxide copolymerized product (PAS-92, trade name, available from Nittobo K.K., Japan) | 3 parts |
| Boric acid | 4 parts |
| Amphoteric surfactant (SWAM AM-2150, trade name, available from Nippon Surfactant, Japan) | 0.3 part |

<Recording Sheet 402>

To the ink-receptive layer of the above-mentioned Recording sheet 401, the above-mentioned compound represented by the formula (a) was added so that it was contained in an amount of 5 $mmol/m^2$.

<Recording Sheet 403>

To the ink-receptive layer of the above-mentioned Recording sheet 401, the above-mentioned compound represented by the formula (b) was added so that it was contained in an amount of 5 $mmol/m^2$.

<Recording Sheet 404>

To the ink-receptive layer of the above-mentioned Recording sheet 401, the above-mentioned compound represented by the formula (VII-a-2) was added so that it was contained in an amount of 5 $mmol/m^2$.

<Recording Sheet 405>

To the ink-receptive layer of the above-mentioned Recording sheet 401, the above-mentioned compound represented by the formula (VII-a-11) was added so that it was contained in an amount of 5 $mmol/m^2$.

<Recording Sheet 406>

To the ink-receptive layer of the above-mentioned Recording sheet 401, the above-mentioned compound represented by the formula (VII-b-2) was added so that it was contained in an amount of 5 $mmol/m^2$.

<Recording Sheet 407>

To the ink-receptive layer of the above-mentioned Recording sheet 401, the above-mentioned compound represented by the formula (VII-b-5) was added so that it was contained in an amount of 5 $mmol/m^2$.

<Recording Sheet 408>

To the ink-receptive layer of the above-mentioned Recording sheet 401, the above-mentioned compound represented by the formula (VII-b-14) was added so that it was contained in an amount of 5 $mmol/m^2$.

With regard to the obtained respective ink-jet recording sheets, ink-absorption property, preservability (light resistance and gas resistance) after printing, and glossiness were evaluated in the same manner as in Example 1. The results are shown in Table 7.

TABLE 7

| Recording sheet | Ink-absorption property | Preservability (%) Light resistance | Gas resistance | Remarks |
|---|---|---|---|---|
| 401 | ○ | 76 | 73 | Comparative |
| 402 | ○ | 79 | 76 | Comparative |
| 403 | ○ | 78 | 75 | Comparative |
| 404 | ○ | 81 | 94 | This invention |
| 405 | ○ | 83 | 93 | This invention |
| 406 | ○ | 80 | 93 | This invention |
| 407 | ○ | 81 | 92 | This invention |
| 408 | ○ | 82 | 92 | This invention |

Glossiness was 60 to 65% in each recording sheet and high glossiness was shown.

As can be clearly seen from the above results, preservability was improved while maintaining high ink-absorption property by using the cationic compound and the mesoionic compound of the present invention in combination. That is, in the present invention, the ink-absorption property and preservability are simultaneously improved and a photo-like high glossiness can be obtained.

Example 11

In the same manner as in Example 10 except for changing the fumed silica used in Example 10 to the fumed silica having an average primary particle size of 15 nm, the same experiments were carried out. As a result, substantially the same results can be obtained with regard to the ink absorption property and prevervability but glossiness was lowered about 3 to 6% than those of Example 10.

Example 12

In the same manner as in Example 10 except for further adding 3 parts of basic polyaluminum hydroxide (Pyurakemu WT, trade name, available from Riken Green K.K., Japan) to Recording sheets 404 to 408 of Example 10 of the present invention, Recording sheets 404A to 408A were prepared, respectively, and evaluated in the same manner as in Example 10. The results are shown in Table 8.

TABLE 8

| Recording sheet | Ink-absorption property | Preservability (%) Light resistance | Gas resistance | Remarks |
|---|---|---|---|---|
| 404A | ○ | 91 | 96 | This invention |
| 405A | ○ | 89 | 95 | This invention |
| 406A | ○ | 90 | 96 | This invention |
| 407A | ○ | 88 | 95 | This invention |
| 408A | ○ | 90 | 96 | This invention |

Glossiness was 60 to 65% in each recording sheet and high glossiness was shown.

As can be clearly seen from the above results, preservability was further improved by using two kinds of the cationic compounds and the mesoionic compound of the present invention in combination.

Example 13

Recording sheets 1 to 4 prepared in Example 1 were used as such. Incidentally, every Recording sheets were so adjusted to become the pH at the surface of the ink-receptive layer of 4.2.

To the coating solution for forming the ink-receptive layer used in Recording sheet 1 of Example 1 were added 3 parts of diallylamine hydrochloride-sulfur dioxide copolymerized product (PAS-92, trade name, available from Nittobo K.K., Japan) as the cationic compound and the specific compound of the present invention as mentioned below to prepare Recording sheets 501A to 507A, respectively. Also, by using 3 parts of basic polyaluminum hydroxide (Pyurakemu WT, trade name, available from Riken Green K.K., Japan) in place of the diallylamine hydrochloride-sulfur dioxide copolymerized product of the above-mentioned Recording sheet, and the specific compound of the present invention as mentioned below, Recording sheets 501B to 507B were prepared.

<Recording Sheets 501A and 501B>

To the ink-receptive layer of the above-mentioned Recording sheet 1, the above-mentioned compound represented by the formula (VIII-a-2) was added so that it was contained in an amount of 10 mmol/$m^2$.

<Recording Sheets 502A and 502B>

To the ink-receptive layer of the above-mentioned Recording sheet 1, the above-mentioned compound represented by the formula (VIII-a-5) was added so that it was contained in an amount of 10 mmol/$m^2$.

<Recording Sheets 503A and 503B>

To the ink-receptive layer of the above-mentioned Recording sheet 1, the above-mentioned compound represented by the formula (VIII-a-11) was added so that it was contained in an amount of 10 mmol/$m^2$.

<Recording Sheets 504A and 504B>

To the ink-receptive layer of the above-mentioned Recording sheet 1, the above-mentioned compound represented by the formula (VIII-a-15) was added so that it was contained in an amount of 10 mmol/$m^2$.

<Recording Sheets 505A and 505B>

To the ink-receptive layer of the above-mentioned Recording sheet 1, the above-mentioned compound represented by the formula (VIII-a-16) was added so that it was contained in an amount of 10 mmol/$m^2$.

<Recording Sheets 506A and 506B>

To the ink-receptive layer of the above-mentioned Recording sheet 1, the above-mentioned compound represented by the formula (VIII-b-3) was added so that it was contained in an amount of 10 mmol/$m^2$ <Recording Sheets 507A and 507B>

To the ink-receptive layer of the above-mentioned Recording sheet 1, the above-mentioned compound represented by the formula (VIII-b-10) was added so that it was contained in an amount of 10 mmol/$m^2$.

With regard to the obtained respective ink-jet recording sheets, ink-absorption property, preservability (light resistance and gas resistance) after printing, and glossiness were evaluated in the same manner as in Example 1. The results are shown in Table 9.

TABLE 9

| Recording sheet | Ink-absorption property | Preservability (%) Light resistance | Gas resistance | Remarks |
|---|---|---|---|---|
| 1 | ○ | 70 | 68 | Comparative |
| 2 | X | 72 | 80 | Comparative |
| 3 | ○ | 78 | 70 | Comparative |
| 4 | ○ | 77 | 72 | Comparative |
| 501A | ○ | 80 | 84 | This invention |
| 502A | ○ | 83 | 92 | This invention |
| 503A | ○ | 82 | 92 | This invention |
| 504A | ○ | 86 | 96 | This invention |
| 505A | ○ | 82 | 95 | This invention |
| 506A | ○ | 84 | 90 | This invention |
| 507A | ○ | 79 | 96 | This invention |
| 501B | ○ | 90 | 89 | This invention |
| 502B | ○ | 92 | 96 | This invention |
| 503B | ○ | 91 | 96 | This invention |
| 504B | ○ | 94 | 98 | This invention |
| 505B | ○ | 91 | 93 | This invention |
| 506B | ○ | 91 | 92 | This invention |
| 507B | ○ | 93 | 95 | This invention |

Glossiness was 60 to 65% in each recording sheet and high glossiness was shown.

As can be clearly seen from the above results, preservability was improved while maintaining high ink-absorption property by using the cationic compound and the amine compound of the present invention in combination. That is, by reducing the amount of polyvinyl alcohol which is a water-soluble binder, the ink-absorption property is improved but the preservability, particularly gas resistance is markedly lowered. In the present invention, the ink-absorption property and preservability are simultaneously improved and a photo-like high glossiness can be obtained.

Example 14

In the same manner as in Example 13 except for changing the fumed silica used in Example 13 to the fumed silica having an average primary particle size of 30 nm, the same experiments were carried out. As a result, substantially the same results can be obtained with regard to the ink absorption property and preservability but glossiness was lowered about 5 to 10% than those of Example 13.

Example 15

Recording sheet 601 was prepared in the same manner as in Recording sheet 1 of Example 1 so that the coated amount of the fumed silica became 18 $g/m^2$ in the solid content and dried. Incidentally, every recording sheets were so adjusted to become the pH at the surface of the ink-receptive layer of 4.2.

<Recording Sheet 602>

To the ink-receptive layer of the above-mentioned Recording sheet 601, the above-mentioned compound represented by the formula (a) was added so that it was contained in an amount of 5 $mmol/m^2$.

<Recording Sheet 603>

To the ink-receptive layer of the above-mentioned Recording sheet 601, the above-mentioned compound represented by the formula (b) was added so that it was contained in an amount of 5 $mmol/m^2$.

To the coating solution for forming the ink-receptive layer used in Recording sheet 601 were added each 3 parts of diallylamine hydrochloride-sulfur dioxide copolymerized product (PAS-92, trade name, available from Nittobo K.K., Japan) and basic polyaluminum hydroxide (Pyurakemu NT, trade name, available from Riken Green K-K., Japan) as the cationic compounds, and the specific compound of the present invention as mentioned below, Recording sheets 604 to 611 were prepared.

<Recording Sheet 604>

To the ink-receptive layer of the above-mentioned Recording sheet 601, the above-mentioned compound represented by the formula (IX-a-1) was added so that it was contained in an amount of 5 $mmol/m^2$.

<Recording Sheet 605>

To the ink-receptive layer of the above-mentioned Recording sheet 601, the above-mentioned compound represented by the formula (IX-a-5) was added so that it was contained in an amount of 5 $mmol/m^2$.

<Recording Sheet 606>

To the ink-receptive layer of the above-mentioned Recording sheet 601, the above-mentioned compound represented by the formula (IX-b-1) was added so that it was contained in an amount of 5 $mmol/m^2$.

<Recording Sheet 607>

To the ink-receptive layer of the above-mentioned Recording sheet 601, the above-mentioned compound represented by the formula (IX-b-4) was added so that it was contained in an amount of 5 $mmol/m^2$.

<Recording Sheet 608>

To the ink-receptive layer of the above-mentioned Recording sheet 601, the above-mentioned compound represented by the formula (IX-b-6) was added so that it was contained in an amount of 5 $mmol/m^2$ <Recording Sheet 609>

To the ink-receptive layer of the above-mentioned Recording sheet 601, the above-mentioned compound represented by the formula (IX-b-7) was added so that it was contained in an amount of 5 $mmol/m^2$.

<Recording Sheet 610>

To the ink-receptive layer of the above-mentioned Recording sheet 601, the above-mentioned compound represented by the formula (IX-c-1) was added so that it was contained in an amount of 5 $mmol/m^2$.

<Recording Sheet 611>

To the ink-receptive layer of the above-mentioned Recording sheet 601, the above-mentioned compound represented by the formula (IX-c-4) was added so that it was contained in an amount of 5 $mmol/m^2$.

With regard to the obtained respective ink-jet recording sheets, ink-absorption property, preservability (light resistance and gas resistance) after printing, and glossiness were evaluated in the same manner as in Example 1. The results are shown in Table 10.

TABLE 10

| Recording sheet | Ink-absorption property | Preservability (%) Light resistance | Gas resistance | Remarks |
|---|---|---|---|---|
| 601 | ○ | 75 | 70 | Comparative |
| 602 | ○ | 77 | 75 | Comparative |
| 603 | ○ | 78 | 73 | Comparative |
| 604 | ○ | 86 | 88 | This invention |
| 605 | ○ | 87 | 90 | This invention |
| 606 | ○ | 84 | 89 | This invention |
| 607 | ○ | 85 | 91 | This invention |
| 608 | ○ | 91 | 92 | This invention |
| 609 | ○ | 89 | 92 | This invention |
| 610 | ○ | 86 | 90 | This invention |
| 611 | ○ | 88 | 90 | This invention |

Glossiness was 60 to 65% in each recording sheet and high glossiness was shown.

As can be clearly seen from the above results, preservability was improved while maintaining high ink-absorption property by using the cationic compound and the amino compound of the present invention in combination. That is, in the present invention, the ink-absorption property and preservability are simultaneously improved and a photo-like high glossiness can be obtained.

Example 16

In the same manner as in Example 15 except for changing the fumed silica used in Example 15 to the fumed silica having an average primary particle size of 30 nm, the same experiments were carried out. As a result, substantially the same results can be obtained with regard to the ink absorption property and preservability but glossiness was lowered about 5 to 10% than those of Example 15.

Example 17

Recording sheet 701 was prepared in the same manner as in Recording sheet 1 of Example 1 so that the coated amount of the fumed silica became 20 $g/m^2$ in the solid content and dried. Incidentally, every recording sheets were so adjusted to become the pH at the surface of the ink-receptive layer of 4.2.

<Recording Sheet 702>

The amount of the polyvinyl alcohol of the above-mentioned Recording sheet 701 was increased to 35 parts.

<Recording Sheet 703>

Carboxymethyl cellulose was used in place of the polyvinyl alcohol used in the above-mentioned Recording sheet 701.

To the coating solution for forming the ink-receptive layer used in Recording sheet 701 of Example 17 were added each 3 parts of diallylamine hydrochloride-sulfur dioxide copolymerized product (PAS-92, trade name, available from Nittobo K.K., Japan) as the cationic compound and the saccharide of the present invention as mentioned below to prepare Recording sheets 704A to 707A! respectively. Also, by using 3 parts of basic polyaluminum hydroxide (Pyurakemu WT, trade name, available from Riken Green K.K., Japan) in place of the diallylamine hydrochloride-sulfur dioxide copolymerized product of the above-mentioned Recording sheet, and the saccharide of the present invention as mentioned below, Recording sheets 704B to 707B were prepared. Moreover, by adding each 3 parts of diallylamine hydrochloride-sulfur dioxide copolymerized product (PAS-92, trade name, available from Nittobo K.K., Japan) and basic polyaluminum hydroxide (Pyurakemu WT, trade name, available from Riken Green K.K., Japan) as well as the saccharide of the present invention as mentioned below, Recording sheets 704C to 707C were prepared.

<Recording Sheets 704A, 704B and 704C>

To the ink-receptive layer of the above-mentioned Recording sheet 701 were added a cationic compound(s) as mentioned above and 2 parts of reduced starch syrup Amameal (trade name) available from K.K. Hayashibara Shoji, Japan (main components comprise 46% of monosaccharide, 36% of disaccharide and 10% of trisaccharide), and Recording sheets were prepared.

<Recording Sheets 705A, 705B and 705C>

To the ink-receptive layer of the above-mentioned Recording sheet 701 were added a cationic compound(s) as mentioned above and 2 parts of reduced starch syrup HS-40 (trade name) available from K.K. Hayashibara Shoji, Japan (main components comprise 5% of monosaccharide, 53% of disaccharide and 23% of trisaccharide), and Recording sheets were prepared.

<Recording Sheets 706A, 706B and 706C>

To the ink-receptive layer of the above-mentioned Recording sheet 701 were added a cationic compound(s) as mentioned above and 2 parts of D-glucose, and Recording sheets were prepared.

<Recording Sheets 707A, 707B and 707C>

To the ink-receptive layer of the above-mentioned Recording sheet 701 were added a cationic compound(s) as mentioned above and 2 parts of D-fructose, and Recording sheets were prepared.

With regard to the obtained respective ink-jet recording sheets, ink-absorption property, preservability (light resistance and gas resistance) after printing, and glossiness were evaluated in the same manner as in Example 1 except for changing the evaluation of the gas resistance after printing to after exposure for 4 months. The results are shown in Table

TABLE 11

| Recording sheet | Ink-absorption property | Preservability (%) Light resistance | Gas resistance | Remarks |
|---|---|---|---|---|
| 701 | ○ | 70 | 68 | Comparative |
| 702 | X | 72 | 80 | Comparative |
| 703 | — | — | — | Comparative |
| 704A | ○ | 85 | 91 | This invention |
| 705A | ○ | 86 | 91 | This invention |
| 706A | ○ | 85 | 94 | This invention |
| 707A | ○ | 86 | 95 | This invention |
| 704B | ○ | 92 | 86 | This invention |
| 705B | ○ | 93 | 86 | This invention |
| 706B | ○ | 92 | 91 | This invention |
| 707B | ○ | 92 | 91 | This invention |
| 704C | ○ | 93 | 92 | This invention |
| 705C | ○ | 93 | 91 | This invention |
| 706C | ○ | 92 | 95 | This invention |
| 707C | ○ | 93 | 95 | This invention |

Recording sheet 703 caused cracking at the time of coating and drying thereof whereby measurement could not be carried out. Each of glossiness of the other Recording sheets than Recording sheet 703 was 60 to 65% and high glossiness was shown.

As can be clearly seen from the above results, preservability was improved while maintaining high ink-absorption property by using the cationic compound and the saccharides of the present invention in combination. That is, by reducing the amount of polyvinyl alcohol which is a water-soluble binder, the ink-absorption property is improved but the preservability, particularly gas resistance is markedly lowered. In the present invention, the ink-absorption property and preservability are simultaneously improved and a photo-like high glossiness can be obtained.

Example 18

In the same manner as in Example 17 except for changing the fumed silica used in Example 17 to the fumed silica having an average primary particle size of 30 nm, the same experiments were carried out. As a result, substantially the same results can be obtained with regard to the ink absorption property and preservability but glossiness was lowered about 5 to 10% than those of Example 17.

Example 19

Recording sheets 801 to 804 were prepared in the same manner as those of Recording sheets 1 to 4 in Example 1. Incidentally, every recording sheets were so adjusted to become the pH at the surface of the ink-receptive layer of 4.2.

To the coating solution for forming the ink-receptive layer used in Recording sheet 801 were added each 2 parts of diallylamine hydrochloride-sulfur dioxide copolymerized product (PAS-92, trade name, available from Nittobo K.K., Japan) and basic polyaluminum hydroxide (Pyurakemu WT, trade name, available from Riken Green K.K., Japan) as the cationic compounds, and the specific compound of the present invention as mentioned below, Recording sheets 805 to 812 were prepared.

<Recording Sheet 805>

To the ink-receptive layer of the above-mentioned Recording sheet 801, the above-mentioned compound represented by the formula (IV-a) (ADK STAB AO-23, trade name, available from Asahi Denka Kogyo, Japan) of the present invention was added so that it was contained in an amount of 10 mmol/$m^2$.

<Recording Sheet 806>

To the ink-receptive layer of the above-mentioned Recording sheet 801, the above-mentioned compound represented by the formula (IV-e) (ADK STAB AO-412S, trade name, available from Asahi Denka Kogyo, Japan) of the present invention was added so that it was contained in an amount of 10 mmol/$m^2$.

<Recording Sheet 807>

To the ink-receptive layer of the above-mentioned Recording sheet 801, D-glucose of the present invention was added so that it was contained in an amount of 10 mmol/$m^2$.

<Recording Sheet 808>

To the ink-receptive layer of the above-mentioned Recording sheet 801, the above-mentioned compound (VIII-a-5) of the present invention was added so that it was contained in an amount of 10 mmol/$m^2$.

<Recording Sheet 809>

To the ink-receptive layer of the above-mentioned Recording sheet 801, the above-mentioned compound represented by the formula (IV-a) (ADK STAB AO-23, trade name, available from Asahi Denka Kogyo, Japan) and D-glucose of the present invention were added so that they were contained each in an amount of 5 mmol/$m^2$.

<Recording Sheet 810>

To the ink-receptive layer of the above-mentioned Recording sheet 801, the above-mentioned compound represented by the formula (IV-e) (ADK STAB AO-412S, trade name, available from Asahi Denka Kogyo, Japan) and D-glucose of the present invention were added so that they were contained each in an amount of 5 mmol/$m^2$.

<Recording Sheet 811>

To the ink-receptive layer of the above-mentioned Recording sheet 801, the above-mentioned compound represented by the formula (IV-a) (ADK STAB AO-23, trade name, available from Asahi Denka Kogyo, Japan) and the above-mentioned compound (VIII-a-5) of the present invention were added so that they were contained each in an amount of 5 mmol/$m^2$.

<Recording Sheet 812>

To the ink-receptive layer of the above-mentioned Recording sheet 801, the above-mentioned compound represented by the formula (IV-e) (ADK STAB AO-412S, trade name, available from Asahi Denka Kogyo, Japan) and the above-mentioned compound (VIII-a-5) of the present invention were added so that they were contained each in an amount of 5 mmol/$m^2$.

With regard to the obtained respective ink-jet recording sheets, ink-absorption property, preservability (light resistance and gas resistance) after printing, and glossiness were evaluated in the same manner as in Example 1. The results are shown in Table 12.

TABLE 12

| Recording sheet | Ink-absorption property | Preservability (%) Light resistance | Preservability (%) Gas resistance | Remarks |
|---|---|---|---|---|
| 801 | ○ | 71 | 70 | Comparative |
| 802 | X | 72 | 78 | Comparative |
| 803 | ○ | 77 | 72 | Comparative |
| 804 | ○ | 78 | 74 | Comparative |
| 805 | ○ | 82 | 89 | This invention |

TABLE 12-continued

| Recording sheet | Ink-absorption property | Preservability (%) Light resistance | Preservability (%) Gas resistance | Remarks |
|---|---|---|---|---|
| 806 | ○ | 82 | 90 | This invention |
| 807 | ○ | 92 | 96 | This invention |
| 808 | ○ | 93 | 97 | This invention |
| 809 | ○ | 95 | 98 | This invention |
| 810 | ○ | 96 | 97 | This invention |
| 811 | ○ | 97 | 99 | This invention |
| 812 | ○ | 96 | 99 | This invention |

Glossiness was 60 to 65% in each recording sheet and high glossiness was shown.

As can be clearly seen from the above results, preservability was further improved while maintaining high ink-absorption property by using the cationic compound and two kinds of the specific compounds of the present invention in combination.

According to the present invention, the ink-absorption property and preservability are simultaneously improved and a photo-like high glossiness can be obtained.

What is claimed is:

1. An ink-jet recording material comprising a support, and an ink-receptive layer provided on the support and containing 65% by weight or more of fumed silica having an average primary particle size of 3 nm to 30 nm based on a total solid content of the ink-receptive layer and 10 to 40% by weight of a hydrophilic binder based on an amount of the fumed silica, wherein said ink-receptive layer contains at least one cationic compound selected from the group consisting of a cationic polymer and a water-soluble metallic compound, and at least one compound selected from the group consisting of a sulfur-containing compound having no mercapto group, an amine compound, an amino compound and a saccharide, and wherein a pH of the surface of the ink-jet recording material is 3 to 6.

2. The ink-jet recording material according to claim 1, wherein the sulfur-containing compound having no mercapto group is at least one compound selected from the group consisting of a sulfinic acid, thiosulfonic acid, thiosulfinic acid, thioether, polysulfide, thiourea and mesoionic compound.

3. The ink-jet recording material according to claim 1, wherein the amine compound or the amino compound is at least one selected from the group consisting of the compound represented by the formula (VIII):

(VIII)

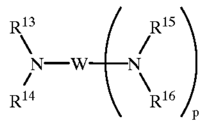

wherein $R^{13}$, $R^{14}$, $R^{15}$ and $R^{16}$ may be the same or different from each other and each represent a hydrogen atom, a substituted or unsubstituted aliphatic group, or a substituted or unsubstituted aromatic group, and these may form a ring by combining with each other, p represents 0 or 1, and when p=0, W represents a monovalent organic group having 6 or more carbon atoms, and when p=1, W represents a divalent organic group, and the compound represented by the formula (IX):

$$V—B—U \qquad (IX)$$

wherein V and U each represent a hydrogen atom, an aliphatic group, an aromatic group or a group containing a basic nitrogen atom, provided that at least one of V and U is a group containing a basic nitrogen atom, and B represents a divalent linking group having two or more alkylene oxide units.

4. The ink-jet recording material according to claim 1, wherein the saccharide is at least one saccharide comprising 15 units or less of monosaccharide.

5. The ink-jet recording material according to claim 1, wherein the ink-jet recording layer contains at least two of the compounds selected from the group consisting of the sulfur-containing compound having no mercapto group, the amine, the amino compound and the saccharide.

6. The ink-jet recording material according to claim 5, wherein the ink-jet recording layer contains the sulfur-containing compound having no mercapto group and the saccharide.

7. The ink-jet recording material according to claim 5, wherein the ink-jet recording layer contains the sulfur-containing compound having no mercapto group and the amine or the amino compound.

8. The ink-jet recording material according to claim 1, wherein the fumed silica has an average primary particle size of about 3 nm to about 15 nm and a specific surface area measured by the BET method of about 200 $m^2/g$ or more.

9. The ink-jet recording material according to claim 1, wherein the hydrophilic binder is at least one selected from the group consisting of a modified polyvinyl alcohol and an unmodified polyvinyl alcohol.

10. The ink-jet recording material according to claim 1, wherein the ink-receptive layer is crosslinked by a crosslinking agent.

11. The ink-jet recording material according to claim 10, wherein the crosslinking agent is at least one selected from the group consisting of boric acid and a borate.

12. The ink-jet recording material according to claim 1, wherein the support is a water resistant support.

13. The ink-jet recording material according to claim 1, wherein the ink-receptive layer contains about 10 $g/m^2$ to about 30 $g/m^2$ of the fumed silica.

14. The ink-jet recording material according to claim 1, wherein the ink-receptive layer contains the hydrophilic binder in an amount of 10 to 30% by weight based on the amount of the fumed silica.

15. The ink-jet recording material according to claim 1, wherein the cationic polymer is a cationic polymer having a weight average molecular weight of about 2000 to about 100,000.

16. The ink-jet recording material according to claim 1, wherein the saccharide contains a component having a polymerization degree of 15 or less in an amount of 50% by weight or more.

17. The ink-jet recording material according to claim 1, wherein the support is a resin-coated paper.

* * * * *